United States Patent
Koushik et al.

(10) Patent No.: US 9,495,142 B2
(45) Date of Patent: Nov. 15, 2016

(54) DYNAMIC RECONSTRUCTION OF APPLICATION STATE UPON APPLICATION RE-LAUNCH

(71) Applicant: Amazon Technologies, Inc., Reno, NV (US)

(72) Inventors: Sheshadri Supreeth Koushik, Redmond, WA (US); Yang Lin, Seattle, WA (US); Jaimin Paresh Shah, Seattle, WA (US); Abhinav Shrivastava, Seattle, WA (US);
(Continued)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/536,583

(22) Filed: Nov. 7, 2014

(65) Prior Publication Data
US 2016/0132310 A1    May 12, 2016

(51) Int. Cl.
*G06F 9/445* (2006.01)
*H04L 29/08* (2006.01)

(52) U.S. Cl.
CPC . *G06F 8/61* (2013.01); *G06F 8/60* (2013.01); *H04L 67/10* (2013.01)

(58) Field of Classification Search
CPC ........................................................ G06F 8/60
USPC ........................................................ 717/176
See application file for complete search history.

(56) References Cited

U.S. PATENT DOCUMENTS

| | | | |
|---|---|---|---|
| 8,364,643 B2 * | 1/2013 | Benari | G06F 9/4443 |
| | | | 707/649 |
| 2002/0032763 A1 | 3/2002 | Cox et al. | |
| 2007/0256073 A1 | 11/2007 | Troung et al. | |
| 2009/0198805 A1 | 8/2009 | Ben-Shaul et al. | |

(Continued)

FOREIGN PATENT DOCUMENTS

WO    02/44892    6/2002

OTHER PUBLICATIONS

U.S. Appl. No. 14/516,233, filed Oct. 16, 2014, Sheshadri Supreeth Koushik.

(Continued)

*Primary Examiner* — Wei Zhen
*Assistant Examiner* — Lanny Ung
(74) *Attorney, Agent, or Firm* — Robert C. Kowert; Meyertons, Hood, Kivlin, Kowert & Goetzel, P.C.

(57) ABSTRACT

A service provider system may include an application fulfillment platform that delivers desktop applications on demand to desktops on physical computing devices or virtual desktop instances of end users. An application delivery agent installed on an end user's computing resource instance may store application state data (e.g., configuration data, runtime settings, or application templates) or scratch data that is generated by an application executing on the computing resource instance to a secure location on service provider storage resources. After a machine failure or change, or a rebuilding of a virtualized computing resource instance or virtual desktop instance, an application delivery agent installed on the new machine or instance may reinstall the application, retrieve the stored application state or scratch data from service provider resources, and restore the application to the last known persisted state. Upon request, (Continued)

the application delivery agent may restore the application to any earlier persisted state.

24 Claims, 10 Drawing Sheets

(72) Inventors: Vikram Vijay Sahijwani, Seattle, WA (US); David Pessis, Seattle, WA (US)

(56) References Cited

U.S. PATENT DOCUMENTS

| | | |
|---|---|---|
| 2011/0295998 A1 | 12/2011 | Ferris et al. |
| 2012/0278439 A1 | 11/2012 | Ahiska et al. |
| 2013/0007737 A1* | 1/2013 | Oh .................. G06F 9/4445 |
| | | 718/1 |
| 2013/0073703 A1* | 3/2013 | Das .................. H04L 67/10 |
| | | 709/223 |
| 2013/0104118 A1 | 4/2013 | Somani et al. |
| 2013/0117804 A1 | 5/2013 | Chawla et al. |
| 2013/0275973 A1 | 10/2013 | Greenfield et al. |
| 2014/0258155 A1 | 9/2014 | Suryanarayanan et al. |
| 2014/0280961 A1 | 9/2014 | Martinez et al. |

OTHER PUBLICATIONS

Invitation to Pay Additional Fees from PCT/US2015/056045, Date of mailing Jan. 13, 2016, Amazon Technologies, Inc., pp. 1-7.
U.S. Appl. No. 15/012,049, filed Feb. 2, 2016, Kypros Constantinides.

\* cited by examiner

DYNAMIC RECONSTRUCTION OF APPLICATION STATE UPON APPLICATION RE-LAUNCH

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Many large companies are attempting to move data center resources to cloud computing environments. These companies may use large amounts of desktop computing software that must be procured, kept up-to-date, and distributed across many desktop computers in multiple locations. Traditionally, in order to execute an application, an end user within a company would log into a physical machine, navigate to a vendor site, download an application, physically install the application on their own computer (which may include choosing an option for automatically installing updates to the application or an option for receiving notifications of available updates), and execute the application locally (on their own computer). Subsequently, when and if the end user is finished using the application, the end user might uninstall the application. At that point, any application state that was generated for the application on behalf of the user would be stored only on the local machine on which the end user installed the application. Therefore, if the end user moved to another machine and again installed the application, the application state that was previously generated would not be available for their use.

Figure 1:
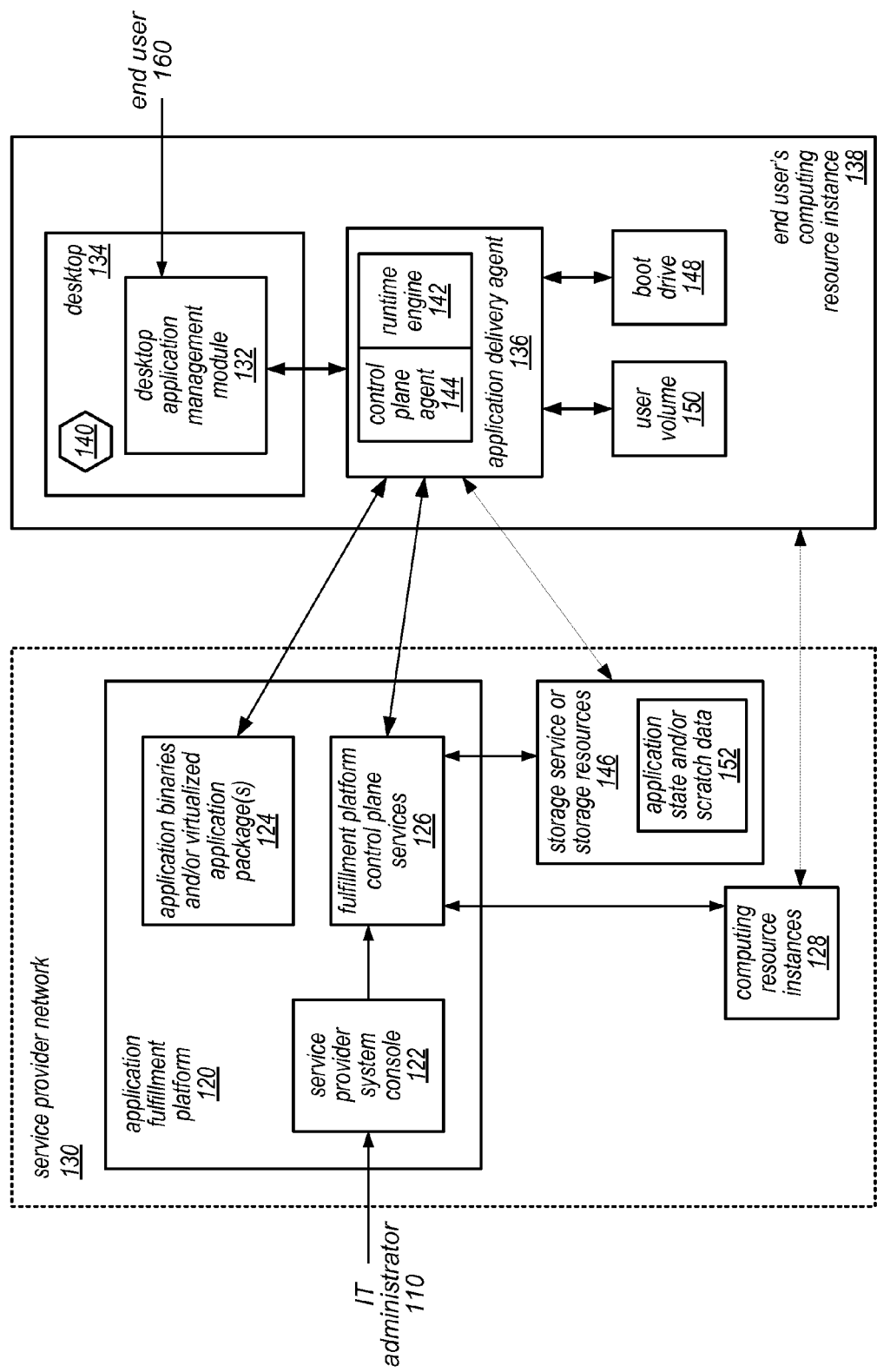
FIG. 1 is a block diagram illustrating one embodiment of a service provider system that is configured to provide on-demand delivery of applications to computing resource instances of its customers' end users.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for providing applications (e.g., desktop applications) through an application fulfillment platform in a service provider system that provides virtualized computing resources to clients are described herein. The systems and methods described herein may provide on-demand delivery and installation of desktop applications to virtual desktop instances in a cloud computing environment for the benefit of end users (e.g., employees or members of a business, enterprise, or other organization that is a customer of the service provider). In some embodiments, the application fulfillment platform may employ a variety of services to manage collections of applications (e.g., catalogs or portfolios of applications) and to deliver virtualized application packages to end user machines or virtual desktop instances.

In some embodiments, customers of a service provider (e.g., buyers or IT administrators within an enterprise) may be able to discover and subscribe to third party applications (or applications that have been purchased or licensed from a third party by the service provider) on-demand and make them available to their end users on virtual desktop instances. In addition, an IT administrator of a customer may be able to publish and manage the customer's own line-of-business applications, which may be accessible only for their end users.

The systems described herein may provide customers the flexibility to build and curate a selection of applications (including those discovered and/or sourced through a desktop application management module) while maintaining secure, scalable and streamlined delivery of applications to their end users. In some embodiments, customers may benefit from on-demand access to applications (e.g., desktop applications) through flexibility, convenience and the use of a pay-as-you-go feature. In addition, customers may be able to manage their diverse application portfolios without making expensive up-front investments. The application fulfillment and management services provided by the systems described herein may be suitable for virtual computing instance customers (e.g., virtual desktop customers) in a variety of industries and sectors, including retailers, financial services providers, technology companies, and customers in the transportation sector.

In various embodiments, the application fulfillment platforms described herein may provide IT administrators full control over their virtual desktop instances with dynamic application management tools. For example, IT administrators in customer organizations may be able to build application catalogs or portfolios for their end users that are composed of applications from sourced through the platform and/or their own private applications, where a portfolio is a collection of applications and corresponding policies (including maintenance schedules and license types), which can be assigned to end users or groups of users. In some embodiments, at least some applications (e.g., required applications) may be pre-installed on the virtual desktop instances that are provisioned for a customer's end users. In some embodiments, customers may allow their end users to install applications on-demand. IT administrators may interact with the application fulfillment platforms through a management console (sometimes referred to herein as a service provider system console or an administrator console) that offers IT administrators access to the tools for managing catalogs or portfolios, application updates, policies, application licenses and/or their own private applications. These tools may include a dashboard that enables IT administrators to easily ingest, package and deliver private applications to their end users. In some embodiments, IT administrators may be able to fully control application updates, which may be installed in the background, and may be non-disruptive to users even if they are using an application that is being updated. The systems described herein may allow customers to efficiently manage their software application spending with detailed usage reports and monthly subscriptions. Because the service provider may be able to negotiate bulk and/or wholesale prices from application vendors, the service provider may be able to offer them to customer (e.g., individually or in bundles containing groups of popular applications) with competitive pricing.

As described in more detail below, the application fulfillment platforms described herein may provide a self-service model to end users through an application (e.g., a desktop application management module) on their virtual desktop instances. For example, through this application, end users can discover and manage an application portfolio that best fits their needs, with the ability to install applications marked as optional by their IT administrators. IT administrators may also have the option to authorize their users to be able to request access to additional applications and/or to receive notifications of new applications or application updates as they become available.

In some embodiments, the systems and methods described herein may be used to dynamically reconstruct the last known persistent state (or another known persistent state) of an application when re-launching the application on behalf of client (e.g., a service provider customer or an end user within a customer organization). For example, the application fulfillment platforms described herein may preserve application state by automatically backing up applications and application data, which may enable subsequent restoration (e.g., in the case of a machine failure or after rebuilding a virtualized computing resource instance or virtual desktop instance on which the application previously executed on behalf of a particular user), provide the ability to roll back the application state to a specific point in time, and/or provide the flexibility to work across multiple virtual desktop instance and/or computing devices.

In the context of the application fulfillment platforms described herein, the terms "customer" and "buyer" may refer to an enterprise, a business, or another organization that receives application management and/or fulfillment services on behalf of their end users from a service provider through such a platform. In this context, the term "sellers" may refer to software vendors that provide their applications for use within the application fulfillment platforms described herein, and the terms "users" and "end users" may refer to employees or members of the enterprise, business, or other organization that receives application management and/or fulfillment services on their behalf from a service provider through such a platform. Users may access applications that are fulfilled through these platforms on their own computing resources instances (e.g., on end user machines and/or virtual desktop instances).

In some embodiments, applications (e.g., desktop applications) may be delivered to various end users' virtual desktop instances using an application virtualization technology that allows safely encapsulates and isolates applications in dedicated containers. For example, a packaging service implemented on the application fulfillment platform may be configured to transform applications into virtualized application packages and to deliver them to virtual desktop instances or physical desktops running over an operating system on an end user's machine. The virtualized application packages, when executed, may perform and behave as if they are natively installed, without the need for actual installation. In some embodiments, this approach may simplify application patch management because patches do not need to be pushed to individual desktops. In some embodiments, the packaging service may be invoked by IT administrators or other IT professionals to convert and validate traditional desktop applications into virtual applications that are compatible with the application fulfillment platforms (and services thereof) that are described herein.

As described in detail herein, an application fulfillment platform may offer customers (or more specifically, IT administrators of those customers) the ability to provision applications on-demand at scale while maintaining centralized control, security and compliance. For example, in some embodiments, these platforms (and corresponding services thereof) may be integrated with a management console through which the IT administrators may discover and subscribe to a broad selection of applications from a variety of sources, build a catalog of applications from a variety of sources and having a variety of subscription/licensing models, control access to applications with granular access policy enforcement on a per user basis, manage application updates, access detailed usage reports for their enterprise, application portfolios and end users, and/or monitor real-time installs as well as license activation on a per application basis.

In some embodiments, the application fulfillment platforms described herein may be integrated with or may be configured to operate in conjunction with a service provider enterprise catalog, e.g., a service that enables administrators to create private catalogs of products and resources from a variety of suppliers, and to share them with a specific set of users. These products may include not only desktop applications to be delivered to virtual desktop instances as virtualized application packages, but may also include server applications (e.g., applications to be executed on a server on behalf of a customer or end user) and/or applications to be delivered as executable files (e.g., application binaries) to be installed on an end user's computing device or virtual desktop instance. If the service provider enterprise catalog is used to create a catalog or portfolio of desktop applications, these applications may be installed as virtualized application packages on an end user's computing resource instance at a later time (e.g., on-demand), as described herein. In some embodiments, the service provider enterprise catalog may enable administrators to offer a standard set of products that meet organizational requirements, and may offer users an opportunity to discover products via a familiar on-line-shopping-type experience, provision service provider resources for their own use, and/or manage service provider resources through a service provider system console. In some embodiments, organizations may benefit from the use of the service provider enterprise catalog through increased standardization, enforced compliance with policies, and improved agility.

As described in more detail herein, in some embodiments, an application fulfillment platform may receive input specifying an intended state of the platform for a given end user and may invoke various services and workflows to translate that intent into reality. This may include provisioning one or more applications on the end user's desktop (e.g., physically installing them on the user's machine, or installing them in a cloud computing environment through a virtual desktop instance). When the end user begins to use one of the applications, the application fulfillment platform (or a component thereof) may manage its subscription, which may trigger metering and billing messages (e.g., emails) and may involve managing third party software licenses for the application, in some cases.

As described herein, a whole enterprise (e.g., a service provider customer) may be represented in the service provider system (and/or in an application fulfillment platform of the service provider system) by an IT administrator who interacts with the system through service provider system console. After logging into the console, the IT administrator may be able to perform a variety of different actions, many of which fall into one of three broad categories. The first category involves action related to building their own catalog, which is a collection of applications that may include their own line-of-business (e.g., custom) applications, applications for which the enterprise has purchased licenses (which may be included in the catalog under a "bring your own license" model), and/or applications purchased from the service provider itself.

In a second category of actions, the IT administrator may (e.g., through the service provider system console) perform actions related to assigning particular applications to specific end users (and/or user groups). For example, an IT administrator may be able to select one or more end users and/or user groups in its active directory and may be able to assign applications (e.g., one or more desktop applications) to the selected end users and/or user groups. For example, the IT administrator may be able to assign an office productivity suite, a data analysis application and/or a browser application to the selected end user(s) and/or user group(s).

In a third category of actions, the IT administrator may (e.g., through the service provider system console) perform actions related to generating, obtaining, and/or viewing reports indicating the usage of the applications that are provided through the service to their end users. The information in these reports may be used by the IT administrator to determine which of several available licensing models may be most suitable for the software being used by their organization.

One embodiment of a service provider system that is configured to provide on-demand delivery of applications (e.g., desktop applications) to computing resource instances of its customers' end users (and/or to dynamically reconstruct a known persistent state of a virtualized desktop application) is illustrated by the block diagram in FIG. 1. As illustrated in this example, the system, implemented on service provider network 130, may include an application fulfillment platform (shown as application fulfillment platform 120). The application fulfillment platform may include an interface mechanism (shown as service provider system console 122) through which an IT administrator of a service provider customer (e.g., a business, enterprise, or organization that receives computing services, storage services, and/or access to second or third party applications from the service provider) can manage the fulfillment of various applications to their end users (e.g., employees or members of the same business, enterprise, or organization). For example, the IT administrator (shown as IT administrator 110) may log into application fulfillment platform 120 (e.g., through a browser or a dedicated client-side application) to access service provider system console 122. The IT administrator 110 may then provide input (e.g., requests for service entered in a graphical user interface of service provider system console 122) in order to create a catalog of applications to be provisioned for the use of their end users, to assign applications to particular end users or user groups, or to generate, obtain, or view usage reports for the applications in the catalog by their end users.

As illustrated in this example, application fulfillment platform 120 may include multiple fulfillment platform control plane services 126, various ones of which may be invoked in response to the inputs received from the IT administrator 110. For example, in response to inputs specifying the addition of an application to a catalog and the assigning of the application to one or more users, a "create fulfillment" workflow may be initiated, which may include operations performed by a fulfillment service, an entitlement service, a delivery service, a packaging service, a device identifier service, and/or a proxy service. These services, and other components of an application fulfillment platform such as application fulfillment platform 120, are described in more detail below, according to at least some embodiments. As illustrated at 124, in this example, applications may be delivered to an end user (such as end user 160) as application binaries (e.g., desktop applications that have been prepared for physical installation on an end user's computing resource instance) and/or as virtualized application packages. For example, in some embodiments, the service provider may (e.g., when ingesting desktop applications for the benefit of its customers and their end users) transform desktop applications into virtualized application packages to be delivered to end users' computing resource instances, and those virtualized application packages may be executed on those computing resource instances without the end user having to install the desktop applications themselves on those computing resource instances.

In some embodiments, an application delivery agent (such as application delivery agent 136) and a desktop application management module (such as desktop application management module 132) may be installed on the end user's computing resources instance 138. In various embodiments, computing resource instance 138 may be a physical computing device (e.g., a desktop or laptop computer, a tablet computing device, or a smart phone) or may be a virtualized computing resource instance (e.g., one that implements a virtual desktop instance). Application delivery agent 136 (which may be a client component of application fulfillment platform 120) may be configured to communicate with various fulfillment platform control place services 126 in order to fulfill requests to subscribe to, install, and/or execute applications selected through desktop application management module 132 or through another user interface mechanism (e.g., application icon 140 on desktop 134 or a start menu item). In other words, desktop application management module 132 is an application that may be installed on the end user's computing resource instance 138 to allow the end user 160 to interact with application fulfillment platform 120 through application delivery agent 136. In some embodiments, application delivery agent 136 may include a runtime engine component that is configured to execute the instructions of a virtualized application package 124 that is delivered (e.g., using demand paging) for a selected application. The functionality of an application delivery agent is described in more detail below, according to at least some embodiments.

As illustrated in FIG. 1, the service provider network may include physical and/or virtualized computing resource instances (e.g., computation resource instances and/or storage resource instances) that may be provisioned on behalf of the business, enterprise, or organization (and its end users). In some embodiments, these computing resources instances (shown as computing resource instances 128 on service provider network 130) may be configured to implement a remote computing application that allows an end user 160 to access applications executing on computing resource instances 128 as if they were installed and executing locally on their machine. For example, in some embodiments, one or more of these computing resources instances 128 may be configured to implement a virtual desktop instance (which may serve as the end user's computing resource instance 138) on which an application delivery agent 136 and a desktop application management module 132 are installed. In such embodiments, desktop 134 in FIG. 1 may represent a view presented by the virtual desktop instance and may appear to the end user 160 as if it were a desktop on the end user's local (physical) computing device. In some embodiments, service provider network 130 may also include storage resources outside of application fulfillment platform 120 (which may be managed by a storage service implemented within service provider network 130) that are configured to store data utilized by application fulfillment platform 120. In various embodiments, application binaries, virtualized application packages, various tables that store information about applications and collections thereof, application state data (which may include application templates, application configuration information, and/or other types of application settings), scratch data generated by various applications, or other information used to provide on-demand delivery of desktop applications to end users and/or to dynamically reconstruct a known persistent state of a virtualized desktop application may be stored outside of application fulfillment platform 120 instead of, or in addition to, within application fulfillment platform 120. For example, application state and/or scratch data (shown as application state and/or scratch data 152) may be stored by a storage service or storage resources (such as storage service or storage resources 142) on service provider network 130. In various embodiments, a storage service 142 may be an object storage service, a file storage service, a database service or any other type of storage service to which application state and/or scratch data can be stored and from which this data can be subsequently retrieved.

As illustrated in this example, desktop application management module 132 (through which the end user 160 may select applications for installation or execution) may execute on the end user's computing resource instance 138, and a graphical user interface of desktop application management module 132 may be displayed on desktop 134. For example, this interface may present a list of applications for selection by the end user 160 (e.g., in order to subscribe to, install, and/or execute an application). In addition, a shortcut or icon for an application (shown as element 140 in FIG. 1) may be displayed on desktop 134 and may be selected in order to launch the corresponding application (e.g., desktop application management module 132, or one of the applications delivered for execution on computing resource instance 138 in response to its selection, by the end user 160, within desktop application management module 132). As illustrated in this example, two separate storage volumes (shown as user volume 150 and boot drive 148) may be installed on the end user's computing resource instance 138. For example, in some embodiments, applications that are delivered to the end user's computing resource instance 138 by the application fulfillment platform may be installed on boot drive 148, and any application state data and/or scratch data that is generated during the building or use of these applications may be written to user volume 150. Note that in embodiments in which the end user's computing resource instance 138 is a virtualized computing resource instance, boot drive 148 and/or user volume 150 may be implemented by computing resources instances 128 on the service provider network 130.

In some embodiments, the fulfillment service implemented by the fulfillment platform control plane described above may be configured to initiate various workflows (e.g., a create/revise fulfillment workflow and/or a revoke fulfillment workflow). These workflows may, in turn, invoke various operations of a device identifier service, an entitlement service, and/or a delivery service. The fulfillment platform control plane may also include a proxy service (through which components of an end user system may interact with at least some of the services implemented on the fulfillment platform control plane) and an identity broker service. In some embodiment, the fulfillment platform control plane may include a queue into which messages may be placed for subsequent retrieval by a control plane agent of an end user system. As noted above, it may also include a storage service or storage resources that are configured to store application state data, application templates, scratch data generated by an application and/or any other application data (as opposed to any outputs or artifacts generated by the execution of an application). The fulfillment platform control plane may also include a packaging service, which may be invoked by the service provider in order to transform executable files of a desktop application that are ingested into and/or stored on the fulfillment platform control plane (such as application binaries) into a virtualized application package for subsequent delivery to end user systems (e.g., to fulfill a request for delivery of an application).

As previously noted, an end user's desktop may be implemented on a physical computing resource instance (e.g., using physical hardware on the end user's local machine) or on a virtual desktop instance (e.g., executing on one or more computing resource instances on machines at the service provider), either of which may run an operating system. In some embodiments of the application fulfillment platforms described herein, some components of the platform may be client-side components that are implemented (or that appear to an end user as if they were implemented) on the end user's system. For example, an end user system may include a computing resource instance, which may include a physical computer (e.g., a physical desktop or laptop computer or another type of physical computing device) and/or a virtualized computing resource instance (which may be implemented by physical resources of the application fulfillment platform or other physical resources of the service provider's system). In some embodiments, virtual desktop instances may be domain joined. For example, they may be joined to a service provider domain and/or to their own domains (e.g., their own company/enterprise domains). As noted above, in some embodiments, an application delivery agent and a desktop application management module may be installed on (and may execute on) an end user's physical or virtualized computing resource instance.

In some embodiments, a desktop application management module may present on the desktop an interface through which the end user can interact with the application fulfillment platform to request and receive desktop applications on-demand. For example, an interface of this application may present a list of applications for selection by the end user (e.g., in order to subscribe to, install, and/or execute an application). In some embodiments, other user interface mechanisms, such as a shortcut or icon through which the desktop application management module or another selected application may be launched by an end user are presented on desktop. In some embodiments, an application delivery agent, which may include a control plane agent component (e.g., one that is configured to interact with the fulfillment platform control plane) and a runtime engine component (e.g., one that is configured to execute virtualized applications on behalf of the end user), may be implemented on the end user's computing resource instance. In some embodiments, the end user and/or control plane agent may communicate with various ones of the services and resources provided by fulfillment platform control plane through a proxy service. The runtime engine component may sometimes be referred to as a "player".

In some embodiments, various communication feeds (e.g., from a service provider system console and/or an intermediate service that processes some or all of the inputs received through the service provider system console) may provide inputs to the fulfillment platform control plane, which is configured to provision the applications that are the subject of notifications to end users, according to the information about the application, the end users, and/or the constraints that is communicated by the communication feeds or that is otherwise discovered by the services of the fulfillment platform control plane. In some embodiments, the fulfillment platform control plane may include multiple components that collectively provide services within the application fulfillment platform (e.g., internal services that perform functions on behalf of other ones of the services) and/or provide services to (or on behalf of) IT administrators or end users, including, but not limited to, a fulfillment service, a device identity service (which may be used in validating unique device identifiers), an entitlement service, a delivery service, and a proxy service.

In some embodiments, the fulfillment service may act as a central hub of the application fulfillment platform. For example, it may receive communication feeds (e.g., a listing feed and/or a principal feed) from the service provider system console, receive requests for subscribing to or unsubscribing from applications from end users (e.g., from control plane agents executing on their computing resource instances through the proxy service) and/or may receive a notification when a new computing resource instance (e.g., a new virtualized computing resource instance and/or virtual desktop instance) is provisioned for an end user. In some embodiments, if (or when) a request is made (e.g., by an IT administrator) to provision or deprovision a computing resource instance (e.g., a virtualized computing resource instance or virtual desktop instance), an end user submits a request to subscribe to or unsubscribe from an application or to install, unstill, or launch an application, or an IT administrator submits a request or command that expresses some other intent, these requests/commands may be passed from the console to the fulfillment service for handling.

In some embodiments, the fulfillment service may maintain a record (e.g., a list) of the intended state of the application fulfillment platform for each user, which may detail the resources (including applications) that are intended to be assigned and/or provided to the end user. Inputs indicating the intended state may be received from the IT administrator (e.g., through the service provider system console) or from an end user's machine (e.g., from a control plane agent, through a proxy service). For example, an IT administrator may, through a communication feed, provide input indicating that user1 belongs to a particular user group and has access to one or more specified applications according to specified constraints. In response to receiving one of such communication feeds, the fulfillment service may be configured to determine the appropriate action to take. For example, the fulfillment service may determine that it should provision a requested application (e.g., an application that specified in the received input as being part of the intended state for the end user), revoke access to an given application (if the application is not specified in the received input as being part of the intended state for the end user), or do nothing (e.g., if the current state for the end user matches the intended state for the user). Once the appropriate action is determined, the fulfillment service may initiate the execution of a corresponding workflow for creating or revising an application fulfillment (e.g., a "create fulfillment" workflow, or a "revoke fulfillment" workflow). These workflows may then use one or more other services to actually provision or revoke the target applications. In some embodiments, rather than taking immediate action, the application fulfillment platform control plane may store the input indicating the intended state of the application fulfillment platform for a given end user for subsequent corrective action. In some such embodiments, the control plane agent installed on an end user's computing resource instance may be configured to poll the application fulfillment platform control plane to determine the intended state (e.g., by reading the recorded intended state). In such embodiments, the control plane agent may be configured to determine whether the current state matches the intended state, and if not, to initiate the taking of corrective action (e.g., initiating the performance of a "create fulfillment" workflow, or a "revoke fulfillment" workflow) through a communication with the fulfillment service (e.g., through the proxy service).

In various embodiments, a "create fulfillment" workflow may include one or more of the following operations: delivering an executable application for installation in an end user's computing resource instance (such as an application binary) or a virtualized application package for the application to be executed on a virtualized computing resource instance or virtual desktop instance without installing the application itself on the virtualized computing resource instance or virtual desktop instance, applying one or more constraints on use of the application by one or more end users (e.g., an environmental constraint, an input parameter constraint, a quota, or a billing constraint), assigning the application to one or more end users, adding a reference to an application to a list of applications presented by a desktop application management module on the desktop, modifying a reference to an application on a list of applications presented by the desktop application management module to indicate that the application is currently available for execution on the end user's computing resource instance, or creating a user interface element on the desktop (such as an icon or a start menu item) whose selection launches the application.

Similarly, a "revoke fulfillment" workflow may, in at least some embodiments, include one or more of the following operations: revoking an assignment of an application to one or more end users, delivering instructions to an agent (e.g., an application delivery agent or a control plane agent thereof) to remove or uninstall an executable application (such as an application binary) or a virtualized application package for the application from the computing resource instance, removing a reference to an application from a list of applications presented by the desktop application management module, modifying a reference to an application on a list of applications presented by the desktop application management module to indicate that the application is not currently available for execution on the computing resource instance, or removing a user interface element from the desktop whose selection launches the application.

In some embodiments, an entitlement service implemented by the fulfillment platform control plane described above may be configured to manage licenses and subscriptions for the applications provided by the application fulfillment platform. For example, in some embodiments, the assignment of an application to an end user (or user group) may represent an agreement to provide access to the application to the end user (or user group) for a specific period of time (e.g., for a specific number of months). In some such embodiments, the entitlement service may be configured to manage subscriptions on a monthly basis, to renew subscriptions periodically (e.g., at the end of each month) and/or at the end of their terms (if they are renewed) or to cancel them if they are not renewed. In some embodiments, the entitlement service may be configured to monitor the usage of the applications provided by the application fulfillment platform by end users or user groups, and/or to generate usage reports for end users or IT administrators periodically and/or on request, detailing license usage by the end users or user groups.

In some embodiments, when a "create fulfillment" workflow is invoked, the entitlement service may expose one or more APIs to the IT administrator (e.g., through a service provider system console). For example, these APIs may include a "register fulfillment" API, a "create monthly subscription" API, an API to request an end user license to be used for a particular application, or an API to request that a subscription be enrolled in a subscription renewal program (e.g., a monthly renewal program). Similarly, when a "revoke fulfillment" workflow is invoked, the entitlement service may expose one or more other APIs to the IT administrator. For example, these APIs may include a "deregister entitlement" API, a "cancel monthly subscription" API, a "cancel this license entitlement" API, or an API to revoke a particular user from a subscription renewal program (e.g., a monthly renewal program).

In some embodiments, a delivery service implemented by the fulfillment platform control plane described above may be responsible for application lifecycle management, the delivery of applications, and the fulfillment of applications on targeted machines. In some embodiments, after an entitlement service has been invoked by a "create fulfillment" workflow to perform operations such as registering a fulfillment, or creating a subscription, license, or entitlement, the "create fulfillment" workflow may request that the delivery service deliver a particular application (e.g., application X) to a particular end user (e.g., user Y) on a particular computing resource instance (e.g., a virtual desktop instance Z), which is the target destination for the application.

In some embodiments, the delivery service may include (e.g., for each end user machine and/or computing resource instance that is registered with the fulfillment platform control plane) a respective outbound channel (which may be implemented as a queue). Each of the outbound channels may be configured to receive and store messages for subsequent retrieval by the control plane agent of the corresponding computing resource instance for the end user (e.g., a control plane agent installed on an end user physical computing device, virtualized computing resource instance or virtual desktop instance) to which it is directed. In some embodiments, the control plane agent may be configured to poll the outbound channel (e.g., periodically), to (at some point) extract any messages that are intended for delivery to the corresponding computing resource instance, and/or to perform and/or manage the work indicated in the messages. In some embodiments, when a message is put in a queue that is intended for a particular end user device or computing resource instance, a notification may be sent to the end user device or computing resource instance indicating that there is a message to be retrieved from the queue. The message may include instructions to be performed by the control plane agent installed on the computing resource instance, e.g., as part of a "create fulfillment" workflow to fulfill or install an application on behalf of the end user and/or as part of a "revoke fulfillment" workflow to revoke or uninstall an application from the end user device or computing resource instance.

Note that, in some embodiments, sending a message to enlist the delivery service in performing portions of a "create fulfillment" workflow may or may not imply that the corresponding resources (e.g., fulfilled applications) are assigned to the end user or the end user's computing resource instance at that point. Instead, the instructions may include an indication of the resources that will be needed and instructions for the steps to take to fulfill/install an application or revoke/uninstall an application fulfillment at a later time. For example, the steps may include registering a session with the particular endpoint, going to a specified location (e.g., in an object or file storage system on the application fulfillment platform) to retrieve a particular file (or set of files) for the application, installing the file(s) in a specified order, and then activating the application (e.g., through another service call).

In some embodiments, an inbound channel may expose whatever the messages in the outbound channel indicate should be exposed. For example, the delivery service may expose an API "register session", after which an application delivery agent (or control plane agent thereof) that is installed and is executing on the computing resource instance may call the delivery service with its security credentials. In order to perform a step to fetch a specified binary file or virtualized application package from storage, the agent may ask the delivery service for the destination at which the application binary file or virtualized application packaged for a particular application can be found. The delivery service may return the location, after which the agent may report back to the delivery service that it has retrieved and/or installed the binary file or virtualized application package, and the delivery service may registered its acknowledgement of fetching the binary or virtualized application package. In some embodiments, to install a virtualized application package, the agent may be responsible for virtualizing the virtualized application package for execution on the computing resource instance (which may include overlaying file system and/or register information for the virtualized application package on the operating system that is executing on the computing resource instance so that it appears that the application is installed on the operating system). Subsequently the agent may request that they delivery service provide it with an active license with which to activate the application. The agent may subsequently report to the delivery service that it has activated the application and/or that it has completed the act of virtualizing the application (as applicable).

In some embodiments, the delivery service may be configured to keep track of the state of applications and to perform various lifecycle management tasks for the applications. For example, the delivery service may keep track of which applications are executing on which computing resource instances, and the state of those applications on those computing resource instances (e.g., which versions of the applications are installed, whether as binary executables or as virtualized application packages). In some embodiments, this information may be used by the system (e.g., automatically) or by an IT administrator to determine when and if any of the applications should be updated.

Application Data Storage

In existing computing systems, when an end user downloads an application and physically installs it on their machine, the application uses various operating system resources and services to execute the application and can also leave a footprint on the operating system. For example, depending on various settings, a browser application may store cookies, session data, password information or other configuration information that is generated at runtime. In another example, if an end user downloads an application development platform or web development platform and installs it on their machine, there may not be any settings selected, or it may be installed with some default settings that can be overridden at runtime. In this example, as the end user uses the development platform, they may make various choices for configuring a repository, deciding how and/or when to compile an application under development (and the compiler to be used), the code review tools to be used in the platform, and other configuration information, and this information may be stored in a configuration file for the development platform. These and other types of configuration-type information generated by an application may sometimes be referred to herein as "application state data", while some other types of information generated at runtime may sometimes be referred to herein as "scratch data". For example, in some embodiments, this scratch data may include temporary data that is needed to execute the application (e.g., temporary data that is generated by a word processing application or image processing application while a document or image is being created or modified), or other information that is generated at runtime, but that is not necessarily configuration-type information.

In these existing systems, the location at which application state data and/or scratch data is stored (e.g., in a configuration file, or in another file, format, or data structure) may be dependent on the application (e.g., the browser or development platform), the operating system, the operating system version, a user profile, or other configuration or preference information for the application or the user. For example, in some operating systems, there may be a standard volume and/or directory under which this type of information is stored. For example, in some systems, applications may be installed on a boot volume, while at least some of the application state data and/or scratch data may be redirected to a user volume (either of which may be a volume on a storage device on the end user's machine or a virtual storage volume within a virtualized computing resource instance or a virtual desktop instance). In other systems, a local user profile or a "roaming profile" may indicate where application state data and/or scratch data are stored. However, in existing systems, if a virtualized computing resource instance or virtual desktop instance on which an application or development platform is executing must be rebuilt for any reason, the newly created virtualized computing resource instance or a virtual desktop instance may be a clean instance that does not have any knowledge of (or way to use) the application state data and/or scratch data that was previously generated by the application. In other words, the end user would have to make all their choices again in order to return the application to its previous state (e.g., its state prior to the rebuild).

In some embodiments of the systems described herein, as an end user is using an application, executing the application may generate application data (e.g., application state data or application templates) in addition to (but not to be confused with) artifacts and/or results that are generated by executing the application. However, unlike in existing systems, the systems described herein may persist any application state data and/or scratch data that is generated by the application or its execution and may subsequently restore it, along with the corresponding application. For example, in some embodiments, a company or enterprise that is a customer of the service provider may choose to create an application template (e.g., for a productivity application or a line-of-business application) and may request that all of its end users (e.g., employees or members of the same organization) use the same application template when using the application. These templates may be stored as application data on the fulfillment platform control plane (such as in application state and/or scratch data 152 illustrated in FIG. 1) by the delivery service.

Again note that artifacts/results generated by executing the application (e.g., documents, presentation materials, engineering specifications/designs, or other outputs of the application, some of which may be the confidential or proprietary property of the customer) may not be stored on the fulfillment platform control plane by the processes implemented on the application fulfillment platform, but may, in some embodiments, be stored elsewhere on the end user system or service provider network by other means. Note also that, in some embodiments of the systems described herein, a user's application data (e.g., application state information or application templates stored in application state and/or scratch data 152) may remain with an end user even if the end user subsequently executes the application on another physical computing device, virtualized computing resource instance, and/or virtual desktop instance. For example, if an end user installs an application to which the end user is entitled on a different virtualized computing resource instance or a different virtual desktop instance than the one on which the end user previously installed the application, any application data generated for, during, or by the previous installation may be brought along with the new installation and applied when executing the application on the new virtualized computing resource instance or on a different virtual desktop instance.

In various embodiments, computing resource instances (including virtualized computing resource instances or virtual desktop instances) may be implemented on computing devices that are domain joined to an active directory. In such embodiments, a user may log into a computing resource instance using their active directory. In some embodiments, in order to access service provider services and/or resources, the end user may have to go through an identity access management (IAM) process or protocol implemented by the service provider before gaining access to at least some of the applications and/or services provided by the application fulfillment platforms described herein. For example, an end user may be logged into a particular computing resource instance using their active directory, but the fulfillment platform control plane may only understand roles and/or tokens generated by the IAM process/protocol. Thus, after logging into the computing resource instance, the user may not have the proper credentials to access the applications and/or services provided by the application fulfillment platform.

In some embodiments, an identity broker service implemented by the fulfillment platform control plane described above may be configured to federate an active directory user in order for the user to gain access to service provider resources. For example, an active directory identifier ticket may be presented to the identity broker service specifying that a principal (user) X wants access to a particular application on machine Y that is connected to domain Z. The identity broker service may communicate with a service provider active directory service and/or another device identity service requesting authentication of the user (X) and/or the user's machine (Y) and the return of a security token that is subsequently usable in accessing service provider resources. In some embodiments, the application delivery agent installed on an end user's computing resource instance (or a control plane agent thereof) may communicate directly with the identity broker service rather than through a proxy service.

In some embodiments, backend services of an application fulfillment platform (e.g., fulfillment platform control plane services) such as those described above (e.g., a fulfillment service, an entitlement service, a delivery service, and/or an identity broker service) may not be exposed to the public (e.g., to end users). For example, these services may not be exposed to end users in an attempt to avoid exposing them to potential malicious attacks (e.g., denial of service attacks or other types of attacks). Instead, a proxy service may be exposed to end users, and this proxy service may be configured to validate the identity of an end user who attempts to access the services of the application fulfillment platform and/or to enforce any applicable metering or throttling policies (e.g., limiting access in order avoid denial of service attacks or other types of malicious accesses) for requests received from end users. For example, in some embodiments, the application delivery agent installed on an end user's computing resource instance (or a control plane agent thereof) may, on behalf of an end user, communicate with the fulfillment service, device identity service, entitlement service, and/or delivery service though a proxy service. If (or once) an end user's identity has been validated, the proxy service may pass or dispatch requests received from the end user to the appropriate backend service (e.g., a fulfillment service, an entitlement service, or a delivery service) for processing.

In some embodiments, if an application delivery agent (or a control plane agent thereof) installed on an end user's computing resource instance wishes to subscribe to an application (on behalf of the end user), the agent may send a request to the proxy service, which may validate its security token, verify that the user is entitled to access the appropriate backend services (through the end user's computing resource instance), and route the request to the fulfillment service. In response, the fulfillment service may process the request and send a response back to the proxy service. In another example, if an agent installed on an end user's computing resource instances wishes to fetch a message from the outbound channel (queue) for its computing resource instance, the proxy service may present the security token to the queue and, once access to the message is verified, return the message to the agent.

In some existing systems, to deliver desktop applications to an end user, executable versions of those desktop applications (e.g., application binaries) are physically installed on an end user's physical computing device (whether or not the physical computing device implements a remote computing application to manage a remote computing session (e.g., a virtual desktop session). In these systems, when an underlying virtual desktop instance is rebuilt, all of the applications and application data associated with that virtual desktop instance is lost and the end user has to reinstall all of the applications on the newly rebuilt virtual desktop instance. In some embodiments of the application fulfillment platforms described herein, rather than physically installing desktop applications on the machines of end users or installing application binaries on the computing resources that implement a virtual desktop instance, delivering at least some applications (e.g., desktop applications) may first include transforming them from one form to another. For example, an office productivity application or browser application may be transformed into a virtualized application package, pages of which may be delivered on demand.

In some embodiments, a virtualization packager may be configured to virtualize the program instructions of an executable application (such as an application binary) to create a virtualized application package that includes a sequence of blocks of virtualized program instructions (also referred to herein a pages of virtualized program instructions). These virtualized program instructions specify how the instructions would execute on the system. In some embodiments this application virtualization technology may include a runtime engine that intercepts all function calls to the operating system of the end user's computing resource instance and executes the virtualized program instructions of the packaged application in an isolated virtual environment (e.g., an isolated container). In other words, the application may behave as if it is running alone in the operating system. In some embodiments, the runtime engine may begin fetching pages of virtualized program instructions (e.g., using demand paging) and may begin executing them before all of the pages have been fetched (e.g., after 5% of the pages, or fewer, have been fetched). In some embodiments, pages that have previously been fetched may be stored locally (e.g., on the end user's machine) in an encrypted cache and subsequently executed (e.g., one or more times). In such embodiments, the performance of the application may be similar to the performance of a native application (e.g., an application binary) that is installed locally on the end user's physical computing device.

In some embodiments, each application (or at least some of the applications) provided by the application fulfillment platforms described herein may be repackaged as a virtual application packaged using a process that is largely automated that does not require any changes to be made to the application or even access to the source code. In some embodiments, in addition to transforming an application into a sequence of blocks of virtualized program instructions, the packaging service may also encrypt the resulting virtualized application package. In some embodiments, the application virtualization described herein may enable applications to run on end users' computers without having to go through the usual install process. Eliminating that installation step and isolating applications from the underlying operating system may enable much more dynamic and flexible application delivery, when compared with classic application installations. For example, the application virtualization described herein may provide, for each application, an isolated container, which may provide flexibility to dynamically move applications and application data across computing resources (including virtualized computing resource instances and/or virtual desktop instances) and instant access to applications. In some embodiments, application updates and/or rollbacks may be applied using the application virtualization described herein with no impact to end users. Note that in some embodiments, the fulfillment platforms described herein may include a commercial virtualization packager and corresponding runtime engine, while in other embodiments, such platforms may include custom virtualization packagers and/or runtime engines.

Administrator Tasks

As previously noted and described in more detail below, in order to manage the delivery of applications to end users, an IT administrator of a business, enterprise, or other organization may be able to perform a variety of different actions through an administrator console of an application fulfillment platform (such as service provider system console 122 in FIG. 1), many of which fall into one of the following three broad categories:

1) Building a catalog for the organization, where the catalog is a collection of applications that may include any of the following application types:
   the organization's own line-of-business (e.g., custom) applications
   applications for which the organization has purchased licenses, including enterprise-wide licenses (e.g., applications that may be included in the catalog under a "bring your own license" model)
   applications purchased or leased from the service provider (e.g., applications that were developed by the service provider or that were purchased or leased by the service provider for the benefit of its customers)
2) Assigning particular applications to specific end users and/or user groups in the same organization
3) Generating, obtaining, and/or viewing reports indicating the usage of the applications that are provided through the application fulfillment platform to end users in the same organization As noted above, the systems and methods described herein for implementing an application fulfillment platform may, in various embodiments, allow large enterprises to create and manage catalogs (or portfolios) of software applications and computation services, including server applications that execute in a cloud computing environment and desktop applications that execute on physical computing devices, virtualized computing resource instances, and virtual desktop instances. These systems may allow service provider customers (e.g., enterprises) to ingest their own line-of-business applications (e.g., server applications and/or desktop applications) into the catalogs, through which they may be made available for use by their end users. In some embodiments, an IT administrator of a service provider customer may interact with the service provider system through an administrator console to assign and provision applications to various end users and/or to define constraints on the use of those applications.

As noted above, in some embodiments, applications (e.g., individual applications and/or collections of applications) may be assigned by an IT administrator to individual users and/or user groups in an active directory to allow access to those applications. For example, an active directory of an enterprise (e.g., a company that is a customer of a service provider) may sit at the center of its resource management processes. Resources (e.g., users, computers, printers, or other corporate resources, each of which may have its own identifier) may be connected to the active directory, and an IT administrator at the company may give users access to particular ones of the resources. In some embodiments, an IT administrator may create a cloud-based active directory for the enterprise. In other embodiments, connections may be made from a virtual desktop instance to an active directory on an enterprise computer system.

In some embodiments, the IT administrator may, through an administrator console (e.g., a service provider system console) assign particular applications to specified users (and/or user groups) by selecting one or more users and/or user groups in its active directory from a display of the active directory (or through another interface into the active directory). For example, the IT admin may be able to assign applications (e.g., one or more desktop applications, such as an office productivity suite, a data analysis application and/or a browser application) to the selected users and/or user groups (e.g., groups of users that are defined in the active directory as the "development team" or "legal team"). In another example, an IT administrator may wish to provision a desktop application (e.g., a word processing application) to user1, user2, and group1 in an active directory. The actions taken in order to carry out that fulfillment may depend on the type of application. In this example, since the application is a desktop application that is available through an application fulfillment platform, the IT administrator may (e.g., through an administrator console) assign the desktop application to user1, user2, and group1, and fulfilling the intended state for user1, user2, and group1 may include invoking various ones of the services implemented by the fulfillment platform control plane described above.

In some embodiments, the IT administrator may, through an administrator console (e.g., a service provider system console) also be able to apply various constraints on the use of selected applications by the users or user groups to which the applications are assigned (either individually, or collectively). For example, in various embodiments, the constraints that may be applied by the IT administrator may be broadly categorized as being one of the following four types: environmental constraints (which may restrict the region in which an application can be provisioned), input parameter constraints (which may restrict the set of valid values for input parameters that can be entered when an application is provisioned or updated), quotas (which may allow the administrator to control the number of concurrent deployments of a given application) and billing constraints (which may allow the administrator to control spending limits on an application by application basis).

In one example, a collection of three applications may be assigned to three active directory users, one of which may represent a user group. In this example, constraints may be set indicating that user1 should use a particular version of application1 (e.g., an office productivity suite) and should not have access to any updated versions of application; that user2 should use a particular version of application2 (e.g., a data analysis application) that is compatible with a particular operating system revision and should not have access to any updated versions of application2; and that user3 (which may represent a group of active directory users) may have access to application3 (e.g., a browser application) that should always be kept current (e.g., with updates applied automatically, when available).

As noted above, in some embodiments, the IT administrator may, through an administrator console (e.g., a service provider system console) be able to generate, obtain, and/or view reports indicating the usage of the applications that are provided through the service to their end users. For example, these reports may indicate how many (and/or which) users are using each application, how many (and/or which) users are using each version (e.g., the latest version or an outdated version) of a particular application, the duration for which each application is used by one or more users, and/or other usage information. The information in these reports may be used by the IT administrator to determine which of several available licensing models (e.g., on-demand subscriptions using licenses obtained by the service provider, enterprise licenses obtained directly from the software vendors but managed by the service provider, etc.) may be most suitable for the software being used by their organization.

In some embodiments, the application delivery agent may include a control plane agent that interacts with the fulfillment platform control plane and the services implemented on the control plane, and another component (a runtime engine) that executes the virtualized program instructions of virtualized application packages on behalf of the end user. In some embodiments, the control plane agent may communicate with various control plane components and services (e.g., an identity broker service and/or outbound channel queue) directly or through a proxy service of the fulfillment platform control plane. For example, in some embodiments, when an end user's machine boots up, its control plane agent may communicate with the identity broker in order to register the machine with the fulfillment platform control plane. In this example, the control plane agent may present a credential (e.g., a machine-level security token or ticket) for a machine Y and may request that the identity broker authenticate and register machine Y with the fulfillment platform control plane. The identity broker may validate the machine, which may include determining whether the owner of the machine has a valid account (e.g., determining whether the account ID associated with the machine is a valid account ID for an enterprise that is a customer of the service provider). If the machine is validated, the identity broker may register the machine with the fulfillment platform control plane.

In some embodiments, once an end user's machine has been registered with the fulfillment platform control plane, when the end user logs onto this machine, the control plane agent on the machine may present another type of ticket (e.g., a user-level ticket, such as a user sign-in ticket) for validation. For example, the user sign-in ticket may indicate that a user X logged onto machine Y on domain Z, and if the identity broker validates the ticket, it may return a security token that the end user can use to access other fulfillment platform control plane services through the proxy service. In some embodiments, there may be multiple authentication processes that must take place before an end user can access the control plane services or virtualized applications provided by the fulfillment platform. For example, one authentication process (e.g., a device-level authentication) may result in the identity broker service described above providing a device-level security token that allows the control plane agent executing on an end user device (e.g., the end user's physical computing device or virtualized computing resource instance) to access to the outbound channel (queue) and proxy service of the fulfillment platform control plane. A second authentication process (e.g., a user-level authentication) may result in the identity broker service providing a user-level security token that allows the end user to access the proxy service of the fulfillment platform control plane only. In some embodiments, separating these two authentication processes may allow some end users to have dedicated devices (e.g., physical computing devices or virtual desktop instances that are allocated from a pool of such devices and on which they are the sole user) and/or may allow multiple end users (or terminals) to use the same device (e.g., to share a single physical computing device or a virtual desktop instance). For example, a device-level authentication may be valid when the control plane agent needs to communicate with the fulfillment platform control plane on behalf of any and all end users who are logged into the device. However, the end users themselves may only be able to access the resources for which they have permissions through their own user-level authentications.

In some embodiments of the fulfillment platforms described herein, the runtime engine portion of the agent on which virtualized applications can execute may be specific to the virtualization packager that is used to transform them into virtualized applications. For example, the runtime engine and virtualization packager may share common instruction formats, file formats, file structures, and/or other features that enable the interpretation of the virtualized applications by the runtime engine.

In some embodiments, each of the virtualized applications that are packaged by the packager may be isolated into a container, such that the contents of each container is executed in isolation by the runtime engine and the individual applications do not know anything about each other. This isolation may allow multiple generations and/or versions of an application to execute on the same physical machine. In various embodiments, and depending on various settings (e.g., off-line or on-line only), the page blocks that make up a virtualized application may or may not be stored locally on the end user's machine during (or following) their execution by the runtime engine.

As previously noted, in some embodiments, an application (which is sometimes referred to herein as a desktop application management module) may be installed on an end user's machine or on a virtual desktop instance that provides an interface to virtualized desktop applications delivered from an application fulfillment platform. In some embodiments, this application may also provide an interface through which applications that are (or can be) physically installed on the end user's machine may be installed or launched. For example, after launching the desktop application management module (e.g., by selecting an icon or shortcut on the desktop or on a virtual desktop), an end user may, through a graphical user interface of the desktop application management module, log into the desktop application management module using their identity, view a list of applications that are available for their use (e.g., applications that they have permission to purchase, lease or subscribe to, install, and/or execute) or that may be made available for their use (e.g., applications for which they may be able to request permission to purchase, lease or subscribe to, install, and/or execute) and select on option to purchase, lease or subscribe to, install, and/or execute one of the listed applications.

In some embodiments, an end user may choose to view applications that are assigned to the end user or are part of a catalog of applications made available to the end user and/or one or more other end users by an IT administrator in the same business, enterprise, or organization (e.g., "my desktop applications"). In response to this selection, a list of applications may be presented to the end user. In some embodiments, the list of applications may indicate, for each application, an application name, the vendor from which the application is sourced, and an available action that can be taken for the application (e.g., "install", for an application that is not currently installed on the end user's computing resource instance, "uninstall", for some of the applications that are currently installed on the end user's computing resource instance). In some embodiments, the list may indicate that particular applications are "required", which may indicate that these applications must be installed on the end user's computing resource instance (e.g., they may have been installed automatically when the computing resource instance was configured or when the desktop application management module was launched) and cannot be uninstalled (until and unless this requirement changes). Some of the applications in the list may be applications that were developed by the end user's company and ingested by the service provider for management through the application fulfillment platform. Applications may be listed in any order, in different embodiments, e.g., in alphabetical order by name or vendor, by application type (e.g., productivity applications, data analysis applications, line-of-business applications, etc.), or by availability (e.g., required applications, optional applications that have been installed, optional applications that have not been installed, etc.). In some embodiments, the end user may have the option to search the list of applications in order to display specific ones of the applications in the user interface for the desktop application management module. In various embodiments, the list of applications may include customer-specific line-of-business applications (e.g., those developed and/or published by the customer organization); applications that were developed and/published by the service provider; applications that were developed, published, and/or otherwise sourced by an entity other than the end user's company or the service provider and that were purchased or licensed by the service provider for the benefit of service provider customer and their end users; and/or applications that were developed, published, and/or otherwise sourced by an entity other than the end user's company or the service provider and that were purchased or licensed by the end user's company for the benefit of their end users.

In some embodiments, the end user may (e.g., based on constraints or permissions applied by their IT administrator) have the option to view a "full application catalog." In some embodiments, the full application catalog may include customer-specific line-of-business applications, applications developed and/or published by the service provider and/or third party applications that have not been assigned to the end user or that are included in a catalog that is made available to the end user by their IT administrator (including some for which the business, enterprise, or organization does not yet have a subscription or license) instead of, or in addition to, applications that are included in a catalog of applications made available to the end user and/or one or more other end users by an IT administrator (whether or not the applications are assigned to the end user). In this case, the end user may select a "request" action in order to request access to (e.g., a subscription to) one of these applications. If the application has not yet been licensed by the service provider or the end user's company, selecting this action may, if the request is approved, initiate the acquisition and/or licensing of the application by the service provider or the end user's company and the ingestion of the application into the application fulfillment platform.

In some embodiments, the end user may also have the option to view "notifications" through the user interface of the desktop applications management module. For example, the end user may receive a notification when a new application is made available to the end user individually, is added to a catalog of applications that are assigned or otherwise to the end user, or is added to the full application catalog, or when a new generation or version of an application to which the end user is currently subscribed is made available. The end user may also be able to request one or more reports (e.g., through selection of a "Reports" item in the user interface of the desktop application management module). As described above, these reports (which provide usage information for various applications, such as those applications that are assigned or available to the end user) may be generated on demand (e.g., in response to requests from an IT administrator or end user) or periodically, and may be presented to an IT administrator or end user when they are generated or upon request, according to various embodiments. In some embodiments, a user interface element may display a list of top rated (or most heavily used) applications for the end user's organization or for all customers, links to ratings or reviews of applications, or any other information about applications that are currently available to (or may be request by) the end user.

In some embodiments, once an end user logs into the desktop application management module, their applications (e.g., any application assigned to the end user) may be available and ready to use. In some embodiments, the end user may access their application just like they access any other desktop applications (e.g., through a start menu or a desktop icon or shortcut). Through the desktop application management module, the end user may be able to select one or more of the following options:

View information about applications that were made available to the end user by their IT administrator
  Subscribe to optional applications
  Remove optional applications
  Request access to additional applications that are listed in the full application catalog, which may include applications sourced by the service provider and/or by third parties (if enabled by the IT administrator)
  Back up their application and configurations (e.g., automatically)
  Receive notification about applications and application updates In some embodiments, if the IT administrator has designated an application as "required" for a given end user, it will be installed on an end user's virtual desktop instance by default, and cannot be remove. However, if the IT administrator has designated an application as "optional", it may only be installed on the end user's virtual desktop instance if the end users choose to subscribe to the application. As noted above, if the IT administrator has enabled the full application catalog as viewable for a given end user, user group, catalog, or portfolio, the end user may be able to discover additional applications that are sourced by the service provider and/or third parties, and select a "request application" option, which may automatically submit a request to the IT administrator for the selected application.

In some embodiments, when a software vendor provides an update to the application fulfillment platform (or to the service provider) the service provider may (e.g., through the application fulfillment platform) publish the update and make it available to end users (e.g., through the desktop application management module. In some embodiments, the IT administrator may be able to control the maintenance window in which application updates are applied to the computing resource instances of its end users. In such embodiments, if an end user is using an application that is targeted for an update during the maintenance window, the end user will not experience any interruption, because the update will occur in the background. However, the next time the end user launches the application, the update will be applied. In some embodiments, there may be a notification engine within the desktop application management module that is configured to inform end users of upcoming application updates and newly available features. The notification engine may be accessed through the desktop application management module graphical user interface, or using other mechanisms, in different embodiments. For example, if the IT administrator has made new optional applications available for end users to subscribe to, they may be notified through the desktop application management module.

In some embodiments, the application fulfillment platform may preserve application state by automatically backing up applications and application data (e.g., application state and/or scratch data) during execution and/or when the end user exits the application for subsequent copy or restore operations. For example, if the virtual desktop instance is rebuilt, the applications and application data may be automatically restored on the virtual desktop instance. Similarly, upon rebooting an end user's machine after a failure, the virtual desktop instance may automatically be rebuilt, and the applications and corresponding application data (e.g., application state data and/or scratch data generated by the application during a previous execution) may be automatically restored. In another example, if the end user shuts down a virtualized computing resource instance (and virtual desktop instance) at the office and subsequently starts up a virtualized computing resource instance (and virtual desktop instance) at home or back in the office the next day, a new virtualized computing resource may be provisioned for the end user (and a new virtual desktop instance may be implemented on the new virtualized computing resource instance for the end user). In some embodiments of the systems described herein, the application fulfillment platform and an application delivery agent installed on the new virtual desktop instance may work together to restore the applications to which the end user is entitled and to restore (e.g., attach) any application state data and/or scratch data generated by those applications during execution on the earlier instance.

In one example, an end user may (through the desktop application management module) select an option to subscribe to a particular listed application. In response, a subscribe request may be sent (e.g., by a control plane agent) to a proxy service using the user's security credentials, and the proxy service may route the request to a fulfillment service. In this example, the subscription request may indicate that user X on machine Y connected to domain Z requests access to the selected application. The fulfillment service may verify whether the end user is entitled to use the selected application and, if so, may initiate the execution of a "create fulfillment" workflow and send a message to that effect to the outbound channel for the target end user machine or virtual desktop instance (e.g., a queue).

On the end user's machine, the control plane agent may (e.g., after communicating the subscription request to the proxy service) poll the outbound channel (queue) looking for messages that are directed to the end user (or to the end user's machine). In this example, since the subscription request included an indication of the end user's machine, the fulfillment service, having a respective outbound channel (queue) for each end user machine and/or virtual desktop instance that is registered with the application fulfillment platform, knows into which of multiple outbound channels (queues) the message should be placed, and a corresponding control plane agent may retrieve the message from that queue. Once the message has been retrieved, the control plane agent may be configured to carry out the steps that are indicated in the message for fulfilling the requested application subscription. For example, the control plane agent may be configured to work through a sequence of steps that include registering a session, virtualizing the selected application, generating an icon or shortcut for the virtualized application and placing it on the end user's machine (e.g., on the desktop or on the virtual desktop) and/or adding the virtualized application to a start menu or other interface mechanism, among other actions.

In some embodiments, once the selected application has been virtualized and an icon, shortcut, menu item, or other user interface mechanism has been provided on the end user's machine (e.g., on the desktop or on the virtual desktop), it may appear to the end user as if the selected application is physically installed on the end user's machine, even though the binary for the selected application is not, in fact, installed on the end user's machine. In this example, when the end user invokes the selected application (e.g., by selecting the icon, shortcut, menu element, or other user interface mechanism or element thereof for the selected application), a runtime engine component of the agent on the end user's machine may be launched to execute the virtualized application. In some embodiments, the runtime engine component may be implemented as a driver-level engine. In some embodiments, the runtime engine component may observe that the user is launching a virtualized application and may intercept the launch. The runtime engine component may use its device-level (i.e., machine-level) security token to communicate to a delivery service of the fulfillment platform control plane that machine Y is starting to deliver the sequence of files or pages of virtualized program instructions that make up the selected virtualized application and to ask the delivery service for instructions. The delivery service may then (e.g., through messages placed in the outbound channel for machine Y) provide instructions to the control plane agent to start making the files or pages of virtualized program instructions available for execution. As the end user begins to use the selected application (i.e., at runtime), the files or pages of virtualized program instructions that make up the selected virtualized application may be made available for execution on the runtime engine component of the agent on the end user's machine. In some embodiments, once the end user is finished using the selected application, the files or pages of virtualized program instructions that make up the selected virtualized application may be cleaned up (e.g., remnants of the files or pages of virtualized program instructions may be removed from local memory), but any application data that was generated for, during, or by the execution of the virtualized application (other than artifacts/results of its execution) may be persisted (e.g., in an application data storage component of the fulfillment platform control plane) for use in a subsequent execution of the selected application by the end user. In other embodiments, the files or pages of virtualized program instructions may be stored locally (e.g., in an encrypted cache from which they may subsequently be executed (e.g., if the end user begins to use application again).

In some embodiments, a fulfillment service implemented by the fulfillment platform control plane described above may provide APIs for service calls, including service calls (made through the administration console) to create or update an application deployment (i.e., a service call that includes an indication of an intended state for an application fulfillment). In response to one of these calls, the fulfillment service may be configured to insert deployment metadata into a deployments table with a "pending" status. If successful, the fulfillment service may insert the deployment request into a queue of such requests. Subsequently, the deployment request may be retrieved from the queue, and a deployment workflow may be launched to process the request. The deployment workflow may include determining the end users and user groups to which an application being deployed is currently assigned (if any), comparing it with the request, and editing a stored mapping between users and the application if necessary; creating a fulfillment request for deployment of the application; and adding the fulfillment request to a queue of pending fulfillment requests (e.g., a queue of pending requests to fulfill an intended state for a given user). In some embodiments, a control plane agent of a virtual desktop instance that is provisioned for the use of the given user (or a thread thereof) may be configured to poll a queue of pending fulfillment requests for the given user and to perform the requested tasks in those requests.

Figure 10:
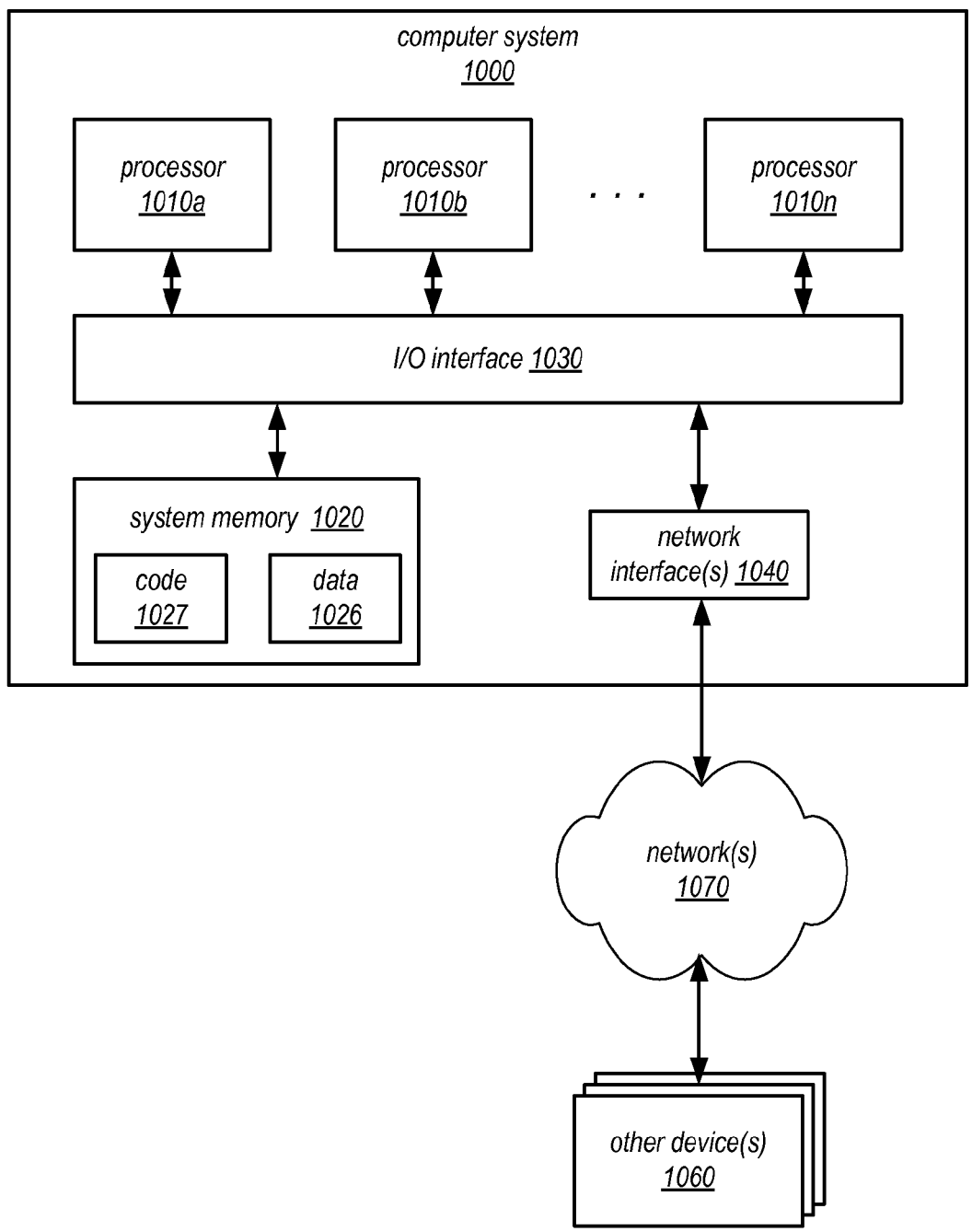
FIG. 10 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for providing on-demand delivery of desktop applications to desktops on physical computing devices and/or virtual desktops in a cloud computing environment and/or dynamically reconstructing a known persistent state of a virtualized desktop application described herein may be implemented is illustrated in FIG. 10. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIGS. 1-4 and 10 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via application programming interfaces (APIs) to the services to obtain and configure resource instances and to establish and manage virtual network configurations that include the resource instances, for example virtualized private networks.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

Figure 2:
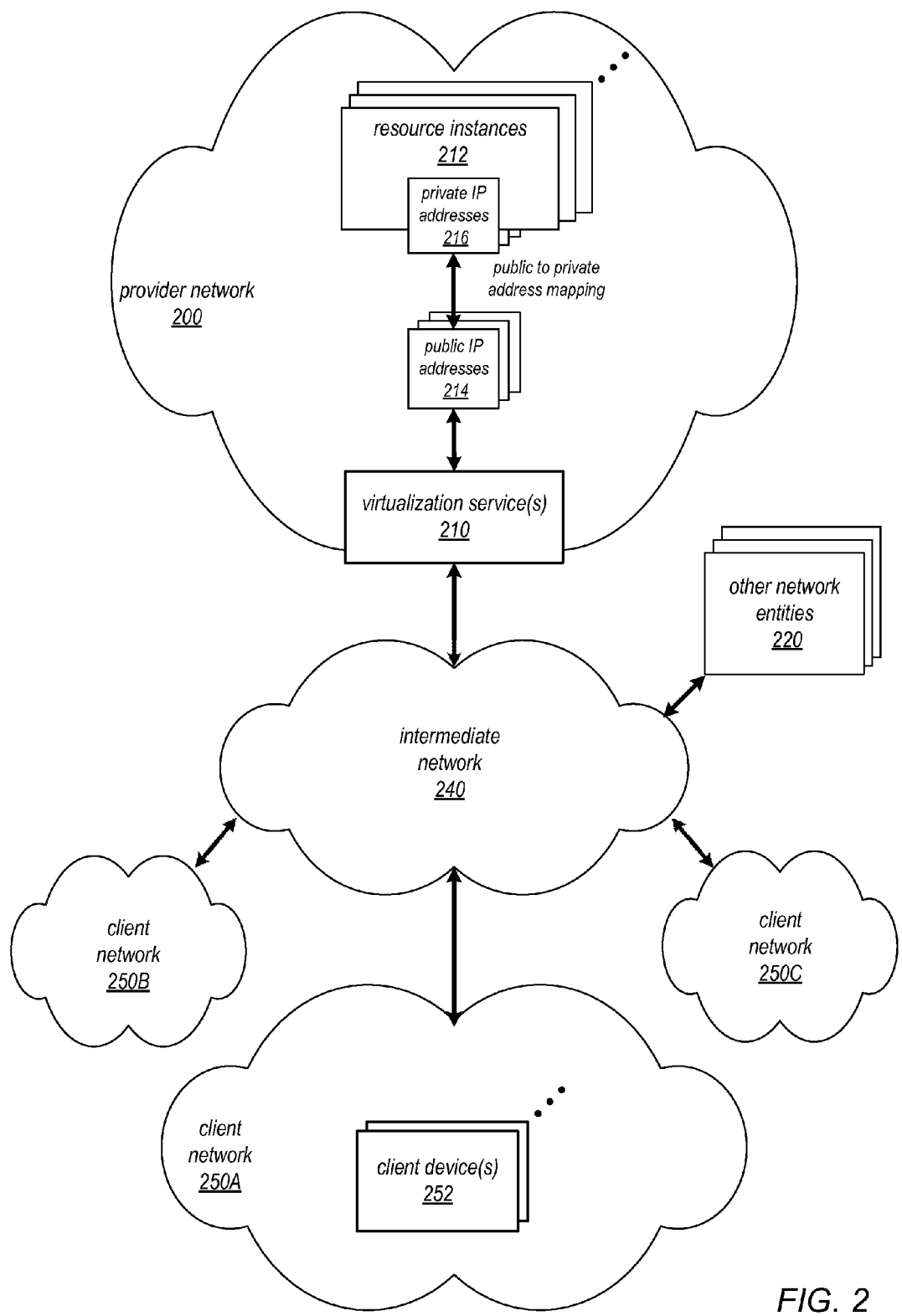
FIG. 2 is a block diagram illustrating an example provider network environment, according to at least some embodiments.

FIG. 2 illustrates an example provider network environment, according to at least some embodiments. A provider network 200 may provide resource virtualization to clients via one or more virtualization services 210 that allow clients to purchase, rent, or otherwise obtain instances 212 of virtualized resources, including but not limited to computation and storage resources, implemented on devices within the provider network or networks in one or more data centers. As described in more detail below, in some embodiments, provider network 200 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 200. Private IP addresses 216 may be associated with the resource instances 212; the private IP addresses are the internal network addresses of the resource instances 212 on the provider network 200. In some embodiments, the provider network 200 may also provide public IP addresses 214 and/or public IP address ranges (e.g., Internet Protocol version 4 (IPv4) or Internet Protocol version 6 (IPv6) addresses) that clients may obtain from the provider 200.

Conventionally, the provider network 200, via the virtualization services 210, may allow a client of the service provider (e.g., a client that operates client network 250A, 250B, or 250C, each of which may include one or more client devices 252) to dynamically associate at least some public IP addresses 214 assigned or allocated to the client with particular resource instances 212 assigned to the client. The provider network 200 may also allow the client to remap a public IP address 214, previously mapped to one virtualized computing resource instance 212 allocated to the client, to another virtualized computing resource instance 212 that is also allocated to the client. For example, using the virtualized computing resource instances 212 and public IP addresses 214 provided by the service provider, a client of the service provider such as the operator of client network 250A may implement client-specific applications and present the client's applications on an intermediate network 240, such as the Internet. Other network entities 220 on the intermediate network 240 may then generate traffic to a destination public IP address 214 published by the client network 250A; the traffic is routed to the service provider data center, and at the data center is routed, via a network substrate, to the private IP address 216 of the virtualized computing resource instance 212 currently mapped to the destination public IP address 214. Similarly, response traffic from the virtualized computing resource instance 212 may be routed via the network substrate back onto the intermediate network 240 to the source entity 220.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 200; a client may then assign their allocated public IP addresses to particular resource instances allocated to the client. These public IP addresses may be referred to as client public IP addresses, or simply client IP addresses. Instead of being assigned by the provider network 200 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 212 that are made available to clients (e.g., client devices 252) via virtualization service(s) 210 may include multiple network interfaces. For example, some of them may include one network interface for communicating with various components of a client network 250 and another network interface for communicating with resources or other network entities on another network that is external to provider network 200 (not shown).

Figure 3:
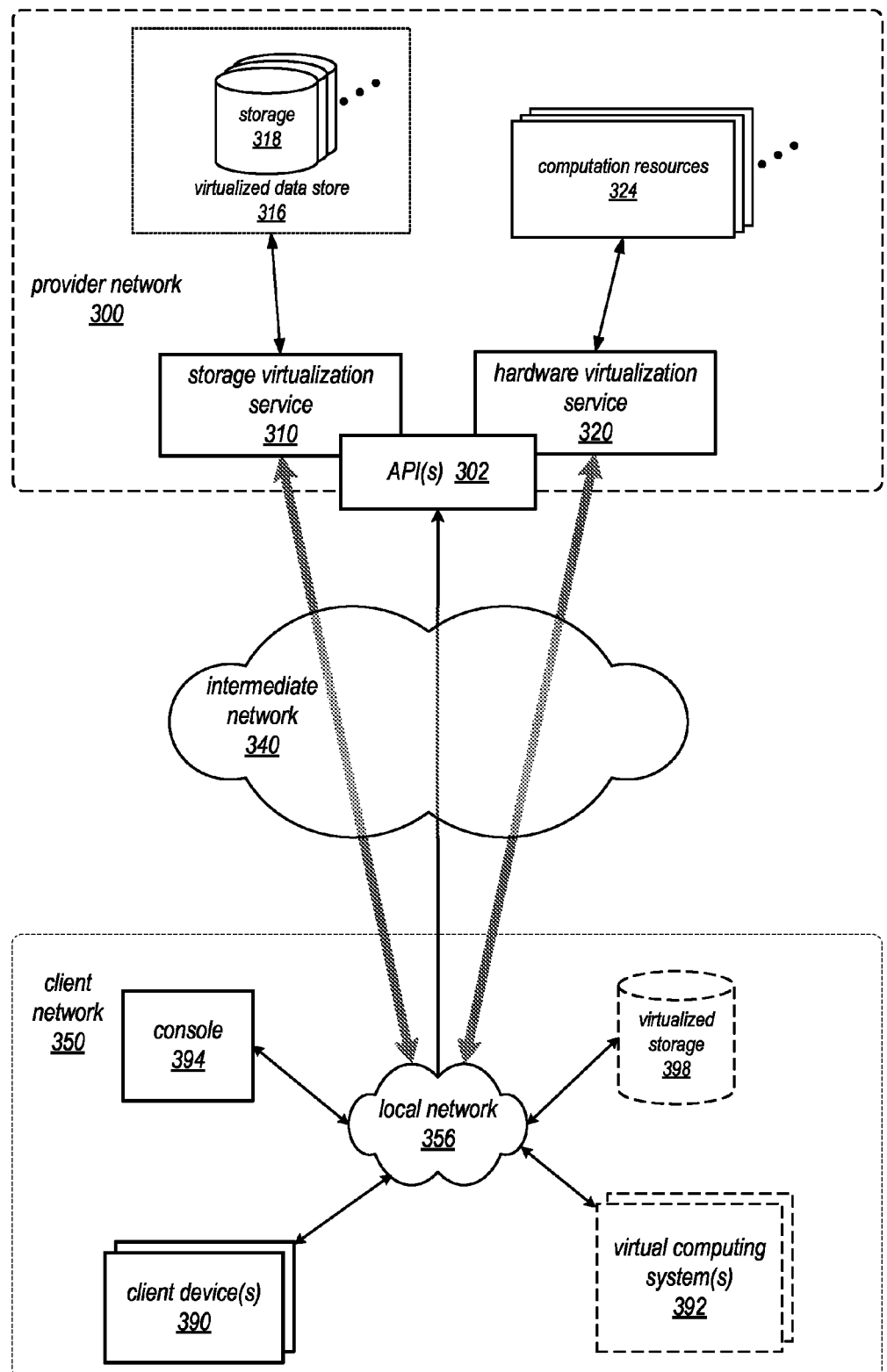
FIG. 3 is a block diagram illustrating an example provider network that provides a storage virtualization service and a hardware virtualization service to clients, according to at least some embodiments.

FIG. 3 is a block diagram of another example provider network environment, one that provides a storage virtualization service and a hardware virtualization service to clients, according to at least some embodiments. In this example, hardware virtualization service 320 provides multiple computation resources 324 (e.g., VMs) to clients. The computation resources 324 may, for example, be rented or leased to clients of the provider network 300 (e.g., to a client that implements client network 350). As noted in the previous example, in some embodiments, provider network 300 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 300. In this example, each computation resource 324 may be provided with one or more private IP addresses. Provider network 300 may be configured to route packets from the private IP addresses of the computation resources 324 to public Internet destinations, and from public Internet sources to the computation resources 324.

Provider network 300 may provide a client network 350, for example coupled to intermediate network 340 via local network 356, the ability to implement virtual computing systems 392 via hardware virtualization service 320 coupled to intermediate network 340 and to provider network 300. In some embodiments, hardware virtualization service 320 may provide one or more APIs 302, for example a web services interface, via which a client network 350 may access functionality provided by the hardware virtualization service 320, for example via a console 394. In at least some embodiments, at the provider network 300, each virtual computing system 392 at client network 350 may correspond to a computation resource 324 that is leased, rented, or otherwise provided to client network 350.

From an instance of a virtual computing system 392 and/or another client device 390 or console 394, the client may access the functionality of storage virtualization service 310, for example via one or more APIs 302, to access data from and store data to a virtual data store 316 provided by the provider network 300. In some embodiments, a virtualized data store gateway (not shown) may be provided at the client network 350 that may locally cache at least some data, for example frequently accessed or critical data, and that may communicate with virtualized data store service 310 via one or more communications channels to upload new or modified data from a local cache so that the primary store of data (virtualized data store 316) is maintained. In at least some embodiments, a user, via a virtual computing system 392 and/or on another client device 390, may mount and access one or more storage volumes 318 of virtual data store 316, each of which appears to the user as local virtualized storage 398.

While not shown in FIG. 3, the virtualization service(s) may also be accessed from resource instances within the provider network 300 via API(s) 302. For example, a client, appliance service provider, or other entity may access a virtualization service from within a respective private network on the provider network 300 via an API 302 to request allocation of one or more resource instances within the private network or within another private network. Note that in some embodiments, the hardware virtualization service 320 may be configured to provide computation resources 324 that have been configured to implement a virtual desktop instance, which may appear to the user as a local desktop (implemented by a virtual computing system 392). Note also that in some embodiments, the computation resources 324 that are made available to the client via hardware virtualization service 320 may include multiple network interfaces. For example, some of them may include one network interface for communicating with various components of client network 350 and another network interface for communicating with computation resources or other network entities on another network that is external to provider network 200 (not shown).

In some embodiments, various components of a service provider network may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given while using the virtual desktop instance. In some embodiments, this may include one or more desktop applications that are packaged as virtualized application packages and that are provided on-demand through an application fulfillment platform implemented on resources of the service provider network. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 4:
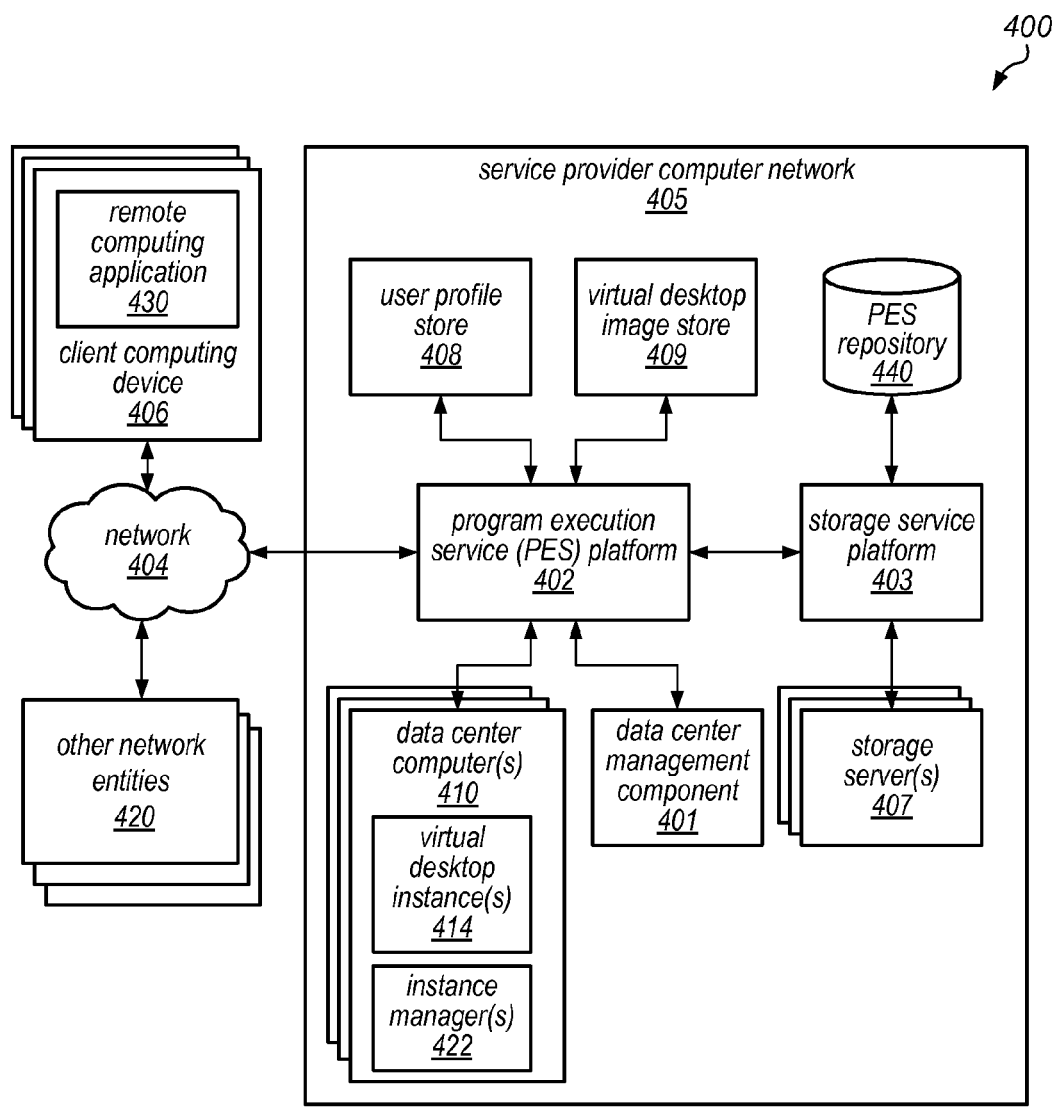
FIG. 4 is a block diagram illustrating a networked computing environment that includes a client computing device in communication with a service provider computer network, according to at least some embodiments.

FIG. 4 is a block diagram illustrating an example networked computing environment 400 that includes a client computing device 406 in communication with a service provider computer network 405 via the communication network 404. The client computing device 406 may be used for providing access to a remote operating system and applications to a user. In various embodiments, the client computing device 406 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 406 includes necessary hardware and software components for establishing communications over a communication network 404, such as a wide area network or local area network. For example, the client computing device 406 may be equipped with networking equipment and browser software applications that facilitate communications via the Internet or an intranet. The client computing device 406 may have varied local computing resources such as central processing units and architectures, memory, mass storage, graphics processing units, communication network availability and bandwidth, etc.

In one embodiment, the client computing device 406 may run a remote computing application 430. The remote computing application 430 may request access to a virtual desktop instance hosted by the service provider computer network 405. The remote computing application 430 may also manage the remote computing session between the client computing device 406 and the service provider computer network 405. As illustrated in FIG. 4, the service provider computer network 405 may also include a PES platform 402. The PES platform 402 illustrated in FIG. 4 corresponds to a logical association of one or more data centers associated with a service provider. The PES platform 402 may be associated with a number of data center computers, such as, for example, data center computers 410. Each data center computer 410 may host one or more virtual desktop instances 414. For example, the data center computer 410 may host a virtual desktop instance by executing a virtual machine on a physical device. The virtual machine may execute an instance of an operating system and application software to create a virtual desktop instance. Each virtual desktop instance executed by the PES 402 may be accessed by one or more client computing devices, such as client computing device 406.

In some embodiments, data center computers 410 may be associated with private network addresses, such as IP addresses, within the service provider computer network 405 such that they may not be directly accessible by the client computing devices 406. The virtual desktop instances 414 may be associated with public network addresses that may be made available by a gateway at the edge of the service provider computer network 405. Accordingly, the virtual desktop instances 414 may be directly addressable by client computing devices 406 via the public network addresses. One skilled in the relevant art will appreciate that each data center computer 410 would include physical computing device resources and software to execute the multiple virtual desktop instances 414 or to dynamically instantiate virtual desktop instances 414. Such instantiations can be based on a specific request, such as from the client computing device 406.

As illustrated in FIG. 4, the data center computers 410 may include one or more instance managers 422. The instance managers 422 may be on the same computer as the respective instances 414, or on a separate computer. The instance managers 422 may track progress of the instances executed on the data center computers 410, monitor and coordinate the storage of data created by the user while interacting with the instances 414 via the client computing devices, and monitor the overall health and state of the data center computers 410 and of the remote computing applications running on the client computing devices 406. The instance managers 422 may communicate information collected through tracking and monitoring with the data center management component 401 of the PES platform 402 in order to efficiently manage the various remote computing sessions between the data center computers 410 and the client computing devices 406.

As illustrated in FIG. 4, the service provider network 405 may also include a storage service platform 403. The storage service platform 403 may include, or be connected to, one or more storage servers 407. The storage servers 407 may be used for storing data generated or utilized by the virtual desktop instances 414. The data generated or utilized by the virtual desktop instances 414 may be based on the interaction between the client computing devices 406 and the PES 402 via one or more remote computing sessions.

In some embodiments, the storage service platform 403 may logically organize and maintain information associated with a hosted virtual desktop instance 414 in a desktop store. The information associated with a virtual desktop instance 414 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 405 may be able to mitigate the effect of failures of the data center computer(s) 410 running the virtual desktop instances 414 or errors associated with the execution of virtual desktop instances 414 on the data center computer(s) 410 by storing data on storage servers independent from the data center computers 410. Additionally, the service provider network 405 may also facilitate client interaction with multiple virtual desktop instances 414 by maintaining the information in the desktop stores. In some embodiments, if one virtual desktop instance 414 fails, a new instance may be launched and attached to the same desktop store that was previously attached to the virtual desktop instance 414 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 414 loses its connection to the desktop store, the PES 402 may switch the connection of the virtual desktop instance 414 from the desktop store to the back-up desktop store.

As illustrated in FIG. 4, the PES platform 402 may also include a central storage device such as a PES repository 440 for storing data stored by the various desktop stores and backup stores on storage servers 407. The data center computers 410 and the storage servers 407 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 405 may include a user profile store 408. The user profile store 408 may be used to store, for example, various programs a user is given access to while using a virtual desktop instance 414. In some embodiments, this may include one or more desktop applications that are packaged as virtualized application packages and that are provided on-demand through an application fulfillment platform implemented on resources of the service provider network 405. The user profiles stored may also indicate a maximum time or cost associated with the remote computing sessions of different users. The PES platform 402 may take user profiles into consideration when placing, configuring, and/or managing virtual desktop instances 414. The PES platform 402 may also include, or be connected to, a virtual desktop image store 409. The virtual desktop image store 409 may include template images of operating systems without customizations applied per user profiles.

In some embodiments, data center computers 410 and storage servers 407 may be considered to be logically grouped, regardless of whether the components, or portions of the components, are physically separate. For example, a service provider computer network 405 may maintain separate locations for providing the virtual desktop instances 414 and the storage components. Additionally, although the data center computers 410 are illustrated in FIG. 4 as logically associated with a PES platform 402, the data center computers 410 may be geographically distributed in a manner to best serve various demographics of its users. Additionally, one skilled in the relevant art will appreciate that the service provider computer network 405 may be associated with various additional computing resources, such additional computing devices for administration of content and resources, and the like. For example, the service provider computer network 405 (and/or various ones of the virtual desktop instances 414 implemented thereon) may be configured to communicate with other network entities 420 over communication network 404 or over another communication network (e.g., at least some of the virtual desktop instances 414 may include a network interface usable to access one or more other network entities 420 that is separate and distinct from to a network interface that is usable to communicate with client computing device 406). These other network entities 420 may include, for example, other client networks or computing devices thereof, computing systems that provide resources for servicing requests received from client computing device 406, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 430. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on preselected options for certain users as determined by administrators of entities associated with the users. For example, the pre-selected options may be presented to the user as a list of different packages of applications to which the user may wish to have access. In some cases, the determination may be made on historical usage data of a user, which the PES platform 402 may determine once the request is received from the user. In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 4 above. In some embodiments, the remote computing application 430 may request that a virtual desktop session be opened on behalf of the client, in response to which a virtual desktop instance 414 may be instantiated, configured for the use of the client, and/or connected to the client computing device 406 over network 404 (e.g., via a network interface of the virtual desktop instance 414).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of desktop applications (e.g., as virtualized application packages) to virtual desktop instances, as described herein.

In some embodiments, these virtual desktop instances may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credential presented by the user upon logging into the virtual desktop instance have been authenticated.

In some embodiments, launching a virtual desktop instance may include making selected applications available to end users through a desktop application management module interface, according to the constraints and configuration parameter settings for the selected applications and users. In some cases, this may include installing any required applications and/or making certain applications (e.g., those applications that are assigned to a particular end user or those an end user is allowed to know about) visible and/or selectable through a desktop application management module interface or (once they are installed on an end user machine or in a virtual desktop instance) through an icon, shortcut, menu element, or other user interface mechanism or element thereof that was created on the desktop for the application and whose selection launches the application.

Again note that, in some embodiments and/or for some applications, "installing" a required or optional application may not include installing the application itself (i.e., an unpackaged application binary) on an end user's physical computing device, virtualized computing resource instance or virtual desktop instance, but may involve delivering some or all of the pages of program instructions of a virtualized application (e.g., using demand paging) to the end user's computing resource instance for execution by a runtime engine that is installed in the end user's computing resource instance.

For example, it may be difficult for a large enterprise (e.g., one that includes a large number of end users who wish to have access to many applications on many different machines) to keep all of the applications its employees may wish to use (e.g., 50 or 60 applications per user) up to date using the traditional approach of physically installing applications on each machine. In various embodiments, the systems and methods described herein may allow enterprise customers to fulfill applications for the use of their end users through a different paradigm, i.e., one that is based on application virtualization. In such embodiments, each application (or version thereof) may be virtualized and packaged to create a virtualized application package (e.g., in an isolated container). These virtualized application packages may not be physically installed on an end user's machine, but instead may be executed on service provider resources (at runtime) by an application delivery agent that is installed on (and is executing on) a virtual desktop instance and that appears to be executing on the end user's machine.

As noted above, in some embodiments, once an end user's machine has been registered with the fulfillment platform control plane, when the end user logs onto this machine, the control plane agent on the end user's machine may present to the fulfillment platform control plane a user-level ticket (such as a user sign-in ticket) for validation. For example, the user sign-in ticket may indicate that a user X logged onto machine Y on domain Z, and if the identity broker validates the ticket, it may return a security token that the end user can use (or the application delivery agent can use on behalf of the end user) to access other fulfillment platform control plane services through the proxy service. In such embodiments, when and if application state data and/or scratch data is generated by the application or its execution, this information may be stored by the application delivery agent (or the control plane agent thereof) in association with the security token that was received from the fulfillment platform control plane and in association with an identifier of the corresponding application. For example, the agent may, periodically (e.g., once every 10 minutes or once every 12 hours) or in response to an event-based trigger (e.g., a change in the application state data, or the end user exiting the application), store the application data (e.g., application state and/or scratch data) in a secure location on service provider resources and/or synchronize the application data stored on service provider resources with the application data that is generated and stored locally during execution of the application.

In some embodiments, the system may be configured to periodically snapshot the entire user volume of the physical or virtualized computing resource instance (or virtual desktop instance) to which application state and/or scratch data generated by executing applications and other data is written (e.g., storing the backup on service provider resources in association with the security token described above). In such embodiments, the most recent snapshot may be restored to a new user volume, which may be attached to a new boot volume of the same physical or virtualized computing resource instance (or virtual desktop instance) or a different physical or virtualized computing resource instance (or virtual desktop instance), following a machine failure, a change of machine for the end user, or the rebuilding of a virtualized computing resource instance or virtual desktop instance (on the same or a different physical machine) on behalf of the end user. In other embodiments, the application state and/or scratch data may be sandboxed (e.g., locally, on the end user's computing resource instance) in an isolated container by the application delivery agent and/or may be stored remotely (e.g., on service provider resources, and in association with the security token and one or more application identifiers) in an isolated container by the application delivery agent. In still other embodiments, if the application writes its application state data and/or scratch data to a particular object- or file-based storage system, the storage system may be configured to take periodic snapshots of the data automatically (e.g., without requiring intervention by the application delivery agent), and the agent may be configured to retrieve the snapshots when needed.

In some embodiments in which applications write their application state and/or scratch data to known storage locations (e.g., to a particular directory structure on a user volume within a physical machine, virtualized computing resource instance, or virtual desktop instance that is standard for all applications or that is specific to the application, or to a storage location indicated in a local or roaming user profile), the application delivery agent may be configured to back up only the storage locations at which the applications currently being used by the end user store their application state and/or scratch data (e.g., backing up only the sub-directories on the user volume storing application state and/or scratch data corresponding to the currently executing applications). For example, the agent may (at various times) be configured to determine the applications to which the end user is entitled, the applications for which the end user has been allocated a license, and/or the applications that the end user is currently executing, and to cause application state data and/or scratch data for those applications to be stored to service provider resources for potential restoration (e.g., after a machine failure, when rolling back an application to a previous state, or upon the re-launching of an application, virtual desktop instance, or virtualized computing resource instance). Note that in embodiments in which applications are installed on an end user's computing resource instance as virtualized application packages that were prepared by an application fulfillment platform such as those described herein, the virtualized application packages may be configured to write application state and/or scratch data to particular storage locations on the end user's computing resource instance (e.g., as overlaid on the operating system over which they will execute), and the fulfillment platform control plane may make this information available to the application delivery agent when the application is installed and/or at another time (e.g., when and if the agent requests this information).

Subsequent to storing the application state and/or scratch data on service provider resources, the security token described above may be used to retrieve and restore the application state data and/or scratch data. For example, in some embodiments, when the end user logs on onto the same machine or a different machine (or logs into a virtualized computing resource instance or virtual desktop instance on the same or machine or a different machine), the application delivery agent installed on the virtualized computing resource instance or virtual desktop instance (or the control plane agent thereof) may again present a user-level sign-in ticket to the control plane and receive the security token back (i.e., the same security token as the one that was previously returned by the control place for this end user). The end user (or the application delivery on behalf of the end user) may then use this security token to determine what applications and corresponding application data (e.g., application state and/or scratch data) should be restored on the end user's new machine, virtualized computing resource instance, or virtual desktop instance.

In one example, after the end user logs onto a different machine and/or a new virtualized computing resource instance or virtual desktop instance is provisioned for the end user, and the end user logs into the new instance, the application delivery agent (or the control plane agent thereof) may contact the fulfillment platform control plane, presenting a user-level sign-in ticket, and receive the security token for the end user. The application delivery agent (or the control plane agent thereof) may then contact the fulfillment platform control place, present the security token for the end user, and request the list of applications to which the end user is entitled. For example, the control plane may maintain (e.g., in association with the security token for the end user) information about the current state and/or the intended state of the application fulfillment platform with respect to the end user (e.g., a list of applications to which the end user has been granted access, those the end user installed on a previously provisioned virtualized computing resource instance and/or virtual desktop instance, and/or those for which a license was allocated to the end user). In various embodiments, this information may be stored in one or more tables or other data structures on service provider resources. The control plane may return the list of applications to which the end user is entitled, after which the application delivery agent may install (or reinstall) one or more of these applications (e.g., overlaying them on the operating system that is executing on the end user's computing resource instance). In addition, the control plane may, for each installed (or reinstalled) application, return to the application delivery agent (or the control plane agent thereof) information indicating the secure location at which the corresponding application data (e.g., application state and/or scratch data) was previously stored (e.g., on service provider resources). This may provide a seamless experience for the end user in which any configuration settings, application templates, or other application state or scratch data are restored to their most recent persisted state.

Figure 5:
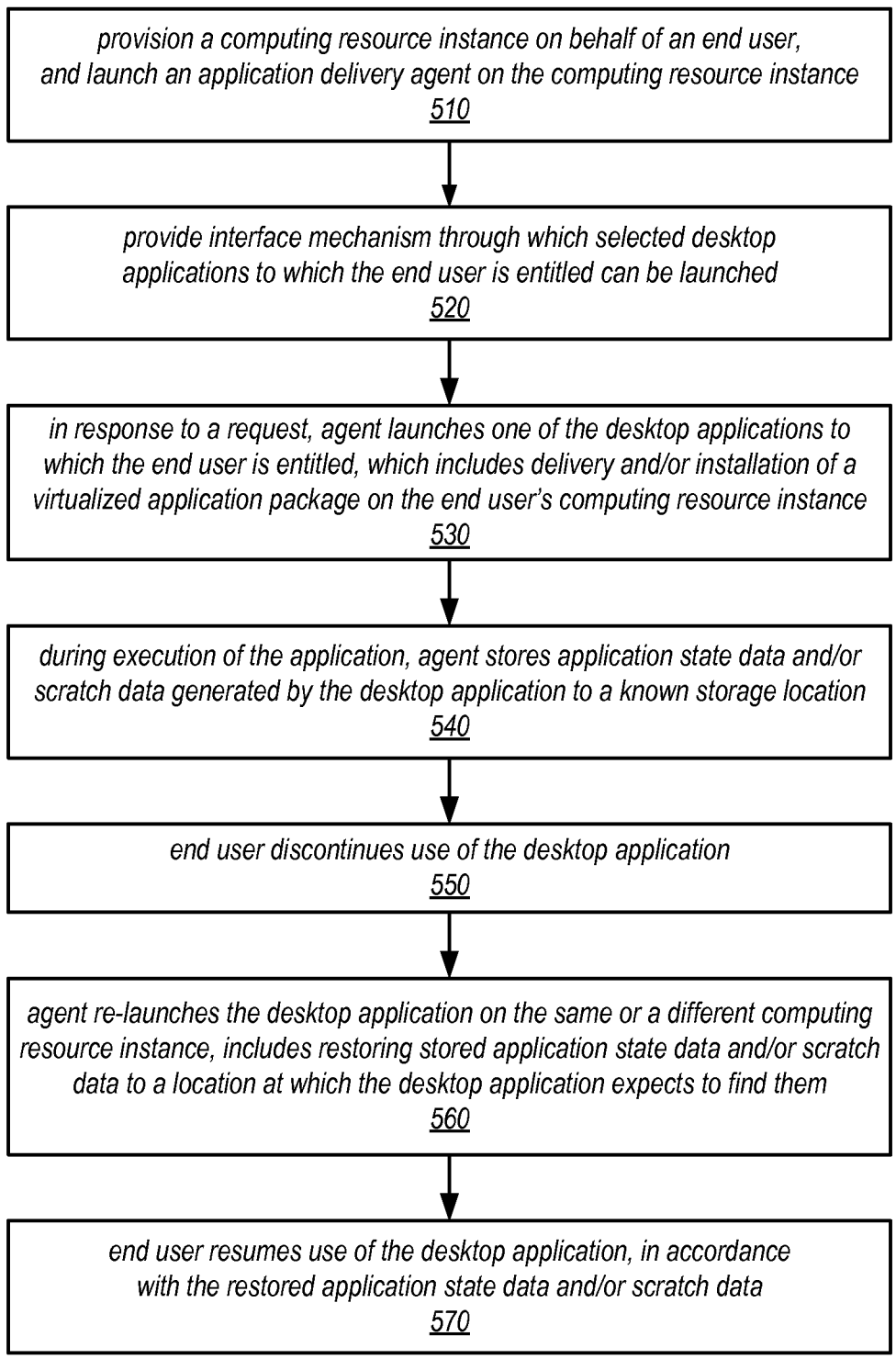
FIG. 5 is a flow diagram illustrating one embodiment of a method for storing and subsequently restoring application state data and/or scratch data generated by a desktop application.

One embodiment of a method for storing and subsequently restoring application state data and/or scratch data generated by a desktop application is illustrated by the flow diagram in FIG. 5. As illustrated at 510, in this example, the method may include provisioning a computing resource instance on behalf of an end user (e.g., a service provider customer or an end user in a service provider customer organization), and launching an application delivery agent on the computing resource instance. The method may also include providing an interface mechanism through which selected desktop applications to which the end user is entitled can be launched, as in 520. For example, in some embodiments, this may include launching a desktop application management module on the computing resource instance and displaying a list of desktop applications to which the end user is entitled, or displaying icons or menu items for the applications to which the end user is entitled. In various embodiments, the list of applications to which the end user is entitled may include one or more desktop applications that were developed and/or published by the service provider, by service provider customer organizations (such as the customer organization of which the end user is a member), and/or third parties (e.g., independent software vendors). In various embodiments, the applications to which the end user is entitled may include applications that were explicitly (and individually) assigned to the end user and/or applications that are included in a catalog or portfolio of applications to which the end user is entitled.

As illustrated in this example, the method may include, in response to a request from the end user, the application delivery agent launching one of the desktop applications to which the end user is entitled, which may include initiating the delivery and/or installation of a virtualized application package for the requested application on the end user's computing resource instance, as in 530. For example, in various embodiments, a virtualized application package may be delivered in an isolated container and may be installed on the end user's physical machine, virtualized computing resource instance or virtual desktop instance (e.g., on a boot volume of the end user's computing resources instance). The method may also include, during execution of the application, the application delivery agent storing application state data and/or scratch data that was generated by the desktop application to a known storage location, as in 540. For example, in various embodiments, the application state data and/or scratch data may be written by the agent to a secure location on the end user's local machine and/or on service provider resources (e.g., through a storage service implemented by the service provider) instead of or in addition to being written to a location determined by the application or operating system (e.g., a standard or default location for storing such data). In some embodiments, the application delivery agent may back up (e.g., create a snapshot of) the application state data and/or scratch data (e.g., only the application state data and/or scratch data) after retrieving it from a known location to which the application or operating system write the data or by intercepting it when written by the application or operating system. In one example, the application delivery agent may know (or be able to determine) which applications executing on the end user's computing resource instance are virtualized applications and may be configured to back up the application state data and/or scratch for those applications (and only those applications) from a known location (e.g., from a user volume on the computing resource instance).

As some point in time, the method may include the end user discontinuing the use of the desktop application, as in 550. For example, the end user may exit the desktop application if they are (at least temporarily) finished using it and/or may shut down or rebuild the computing resources (e.g., a virtualized computing resource instance or virtual desktop instance) on which it is executing. Subsequently, the method may include the application delivery agent re-launching the desktop application on the same computing resource instance or on a different computing resource instance, which may include restoring the stored application state data and/or scratch data to a location at which the desktop application expects to find them (as in 560). For example, in some embodiments, the stored application state data and/or scratch data may be retrieved from secure storage on the service provider resources and may be restored to a location on the computing resources instance at which the desktop application expects to find it (e.g., on the user volume of the computing resource instance, in a location specified by the application, or in a location specified in a local user profile or roaming profile). The method may also include the end user resuming the use of the desktop application, in accordance with the restored application state data and/or scratch data, as in 570.

Figure 6:
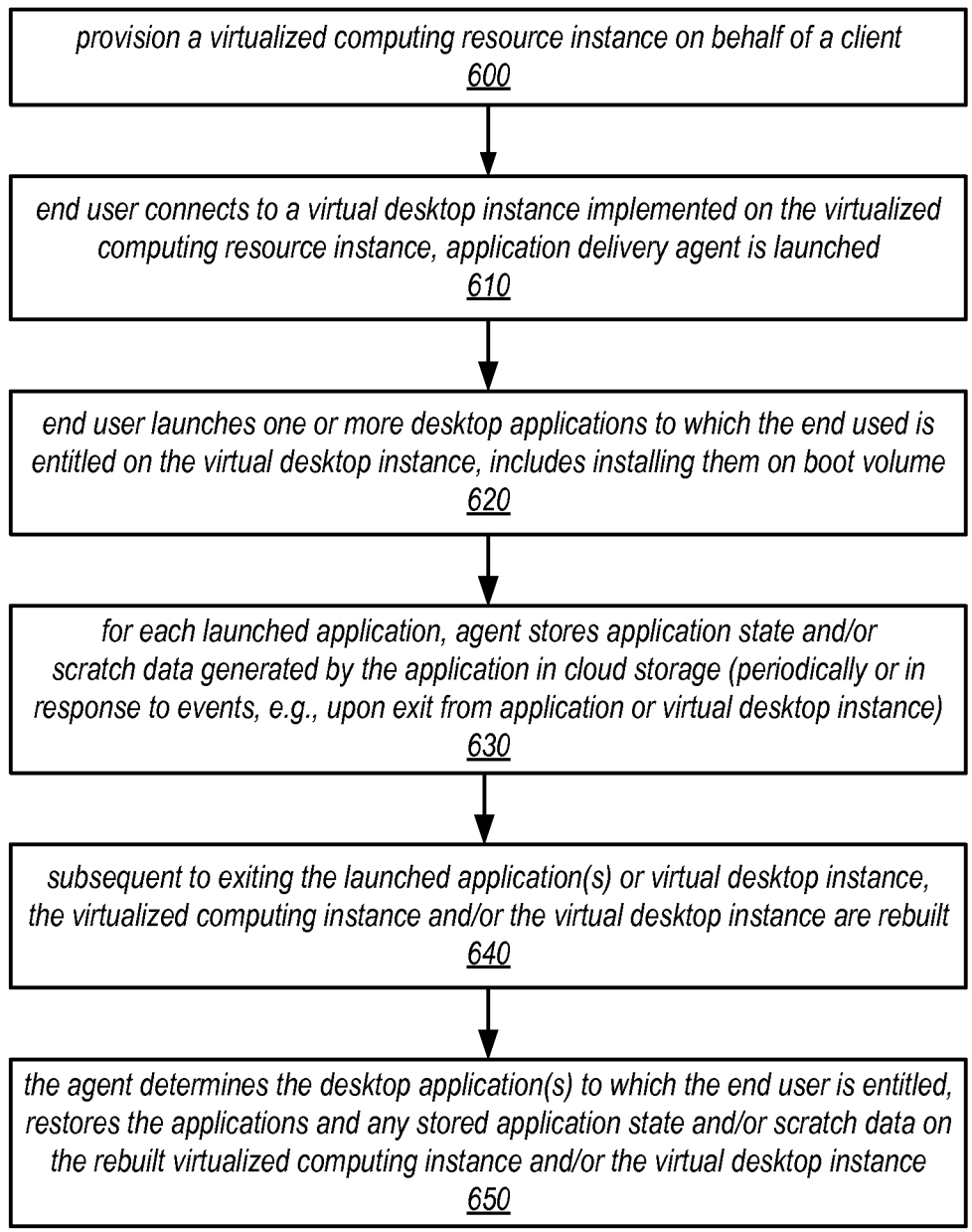
FIG. 6 is a flow diagram illustrating one embodiment of a method for storing and subsequently restoring application state data and/or scratch data generated by a desktop application that is executing on a virtual desktop instance.

One embodiment of a method for storing and subsequently restoring application state data and/or scratch data generated by a desktop application that is executing on a virtual desktop instance is illustrated by the flow diagram in FIG. 6. As illustrated at 600, in this example, the method may include provisioning a virtualized computing resource instance on behalf of a client (e.g., a service provider customer or an end user in a service provider customer organization). The method may include an end user connecting to a virtual desktop instance implemented on the virtualized computing resource instance, and launching an application delivery agent on the virtual desktop instance, as in 610. In some embodiments, connecting to the virtual desktop instance may require approval (e.g., the request may need to be authenticated). In some embodiments, the application delivery agent may be launched automatically when the end user connects to the virtual desktop. In some embodiments, the method may also include launching a desktop application management module (e.g., automatically or following its selection by the end user through an icon, menu item or other interface mechanism).

As illustrated in this example, the method may include the end user launching one or more desktop applications to which the end used is entitled on the virtual desktop instance, which may include the application delivery agent installing those applications on a boot volume of the virtual desktop instance, as in 620. For example, the end user may select one or more of the applications that the end user is authorized to subscribe to, install, and/or launch a through desktop application management module, or through desktop icons, menu items or other interface mechanisms. The method may also include, for each launched application, the application delivery agent storing application state and/or scratch data generated by the application in cloud storage (e.g., on service provider resources) periodically or in response to certain events (e.g., the end user exiting the application or logging off the virtual desktop instance, or an application state change), as in 630. For example, in some embodiments, the application or operating system on which it is executing may store application state and/or scratch data on a user volume of the virtual desktop instance and the application delivery agent may back up this information periodically. In other embodiments, operations performed by the application to write out the application state and/or scratch data may be intercepted and redirected to another location (e.g., a local location from which it may be subsequently backed up or a location on service provider storage resources), or the application delivery agent may take event-triggered snapshots of the application state and/or scratch data that is stored locally (e.g., on the user volume).

As illustrated in this example, subsequent to the end user exiting the launched application(s) or virtual desktop instance, the method may include rebuilding the virtualized computing resource instance and/or the virtual desktop instance, as in 640. For example the virtualized computing resource instance and/or the virtual desktop instance may be rebuilt in response to a machine failure, a change of machine for the end user, or the end user logging off of a machine and then logging back onto the same machine. The method may also include the application delivery agent determining the desktop application(s) to which the end user is entitled, and restoring the applications and any stored application state and/or scratch data for those applications on the rebuilt virtualized computing resource instance and/or the virtual desktop instance, as in 650. For example, the application delivery agent may reinstall the virtualized application package for each of the applications to which the end user is entitled and may attach the corresponding stored application state and/or scratch data to the application (e.g., by restoring it on a user volume of the rebuilt virtualized computing resource instance or virtual desktop instance or by retrieving it from storage and restoring it to a location at which the application expects to find it).

Figure 7:
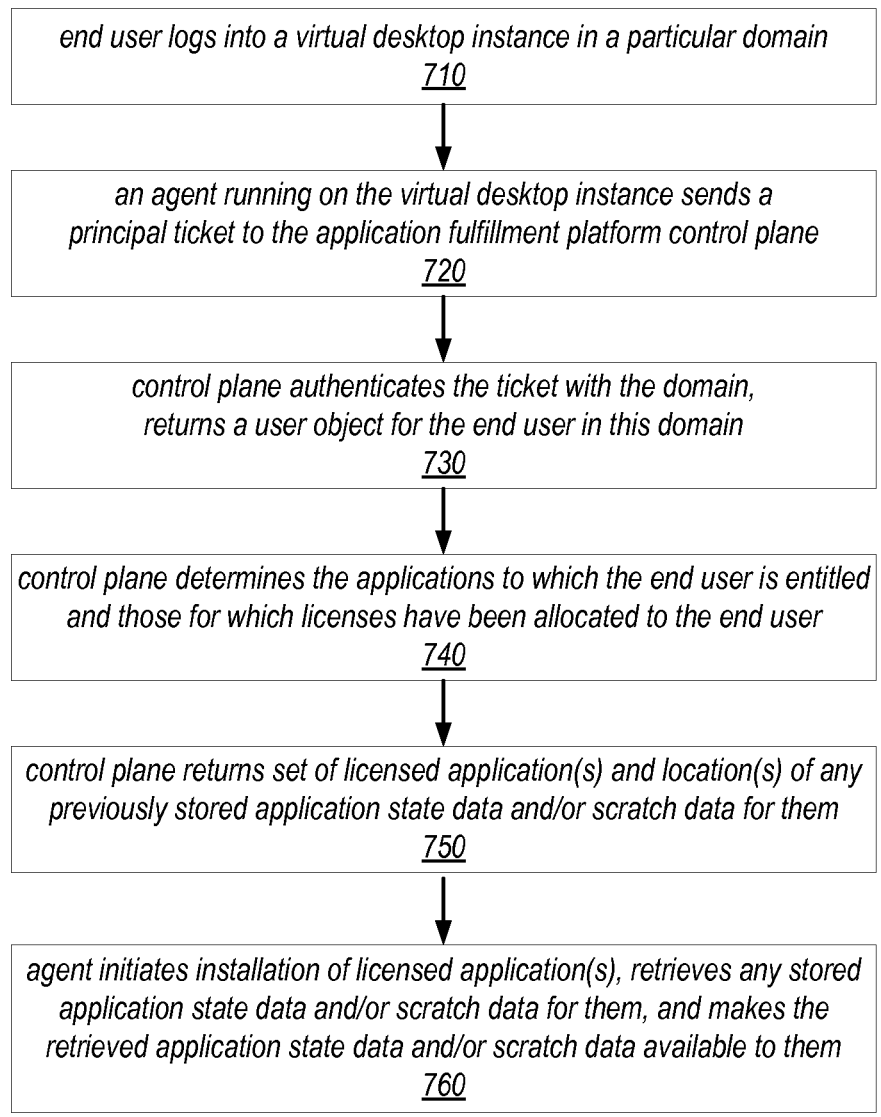
FIG. 7 is a flow diagram illustrating one embodiment of a method for restoring, to a virtual desktop instance, desktop applications and any corresponding application state data and/or scratch data that was previously stored for those applications.

One embodiment of a method for restoring, to a virtual desktop instance, desktop applications and any corresponding application state data and/or scratch data that was previously stored for those applications is illustrated by the flow diagram in FIG. 7. As illustrated at 710, in this example, the method may include an end user (e.g., a service provider customer or an end user in a service provider customer organization) logging into a virtual desktop instance in a particular domain. The method may include an application delivery agent that is running on the virtual desktop instance sending a principal ticket (e.g., a ticket identifying the end user and/or the end user's computing resource instance) to the application fulfillment platform control plane, as in 720. The method may include the control plane authenticating the ticket with the domain and (assuming the ticket is authenticated) returning a user object (e.g., a security token) for the end user in this domain, as in 730.

As illustrated in this example, the method may include the control plane determining the applications to which the end user is entitled and (of those) the applications for which licenses have been allocated to the end user, as in 740. For example, in some embodiments, the control plane may maintain information indicating the current state and/or the intended state of the application fulfillment platform for the end user in association with the user object (user ID). The method may also include the control plane returning information identifying a set of licensed application(s), along with the corresponding location(s) of any previously stored application state data and/or scratch data for the licensed applications, as in 750. For example, the control plane may return a list of licensed applications to be displayed by a desktop application management module or may return information identifying a list of licensed applications to the application delivery agent, and may also send a URL, file descriptor, or other info indicating the secure location(s) at which application state data and/or scratch data was previously stored for these applications on behalf of this end user. The method may also include the application delivery agent initiating the installation of licensed application(s), retrieving any previously stored application state data and/or scratch data for those applications, and making the retrieved application state data and/or scratch data available to them, as in 760. For example, the application delivery agent may initiate the performance of one or more "create fulfillment" workflow(s) for installing any required applications and any optional applications that were previously installed on behalf of the end user (e.g., on a different virtualized computing resource instance or virtual desktop instance).

As previously noted, in some existing systems, whenever an application that was previously installed on a virtualized computing resource instance or virtual desktop instance on behalf of an end user (and that was registered with the operating system using a particular application identifier (e.g., a globally unique identifier, or GUID) is subsequently reinstalled on a different virtualized computing resource instance or virtual desktop instance, it may be assigned a new application identifier (GUID). In these existing systems, any application state data or scratch data that was stored in association with the earlier GUID by the application when it was previously installed may not be accessible to the newly reinstalled application (since its GUID does not match the GUID associated with the stored data). However, in some embodiments of the systems described herein, the application virtualization technology used to package desktop applications for delivery to an end user's computing resource instance (whether it is a physical computing device or a virtualized computing resource instance on which a virtual desktop instance is implemented) may support a construct (e.g., a file system filter driver construct) through which write operations to a particular namespace may be detected and intercepted. For example, in some embodiments, all desktop applications that are delivered by an application fulfillment platform (such as those described herein) as virtualized application packages may be registered with a particular namespace (e.g., a namespace corresponding to the service provider). The application delivery agents installed on end users' computing resource instances may recognize that applications registered using this namespace are virtualized applications, and may be configured to intercept write operations associated with this namespace (e.g., write operations in which application state data and/or scratch data are written out) and to redirect them to pre-defined target locations (e.g., locations that may or may not be on the same physical drive or virtual storage volume as their original target locations). The application delivery agent would thus know the location of the application state data and/or scratch data, allowing the agent to snapshot the data during execution of the application and to subsequently restore it (e.g., to the same location) following a reinstallation of the application. Note that, from the perspective of the operating system and/or application, it may appear as if these write operations are performed as in the original code.

Figure 8:
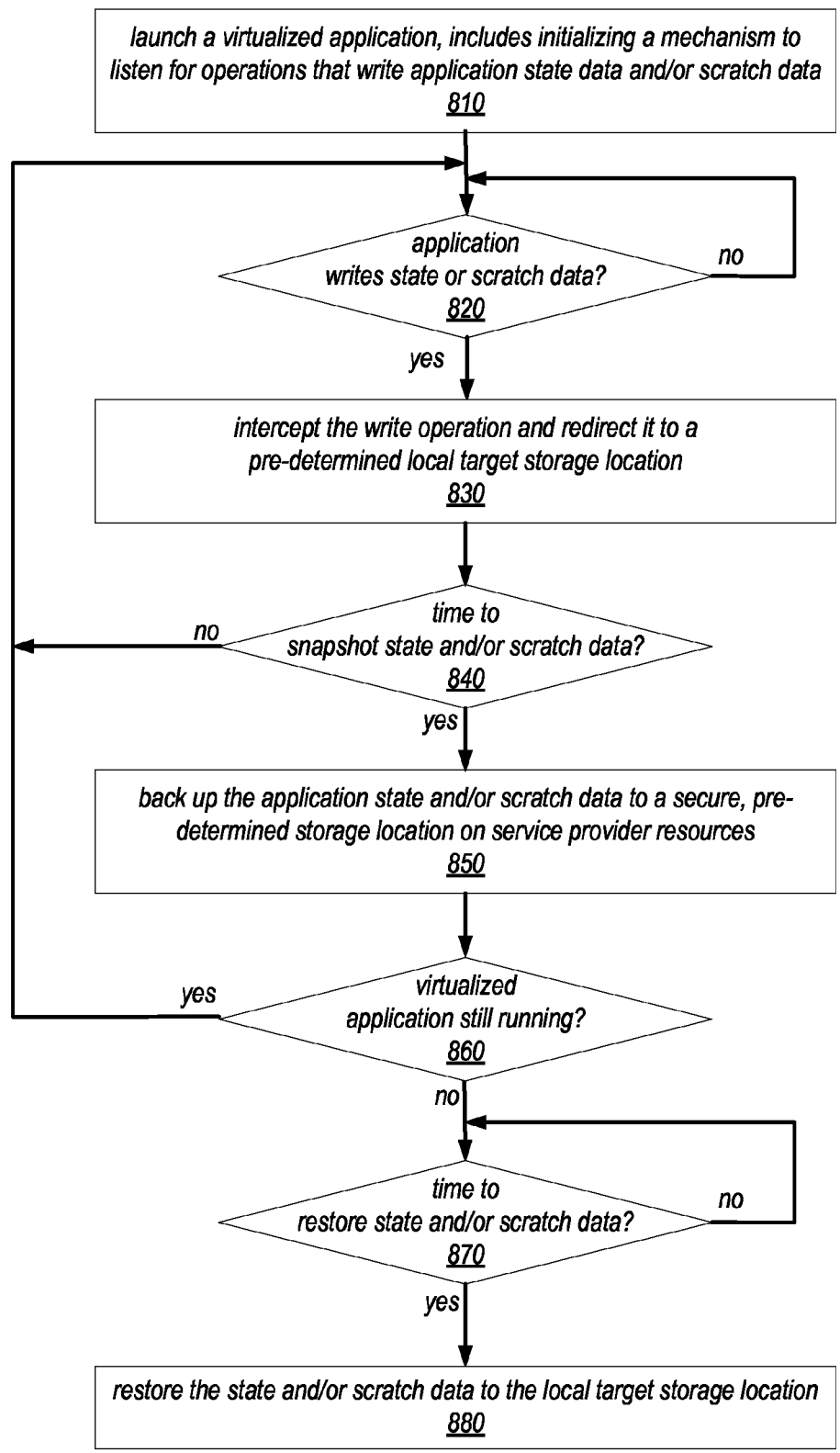
FIG. 8 is a flow diagram illustrating one embodiment of a method for intercepting and redirecting operations that write out application state data and/or scratch data in order to snapshot and subsequently restore the data.

One embodiment of a method for intercepting and redirecting operations that write out application state data and/or scratch data in order to snapshot and subsequently restore the data is illustrated by the flow diagram in FIG. 8. As illustrated at 810, in this example, the method may include launching a virtualized application, which may include initializing a mechanism to listen for operations that write out application state data and/or scratch data. For example, in some embodiments, when an application delivery agent installs a virtualized application package for a desktop application, the virtualization process may (optionally) add such a mechanism. In some embodiments, this mechanism may be added to all virtualized applications delivered by the application fulfillment platform (e.g., for applications that are registered in particular namespace, such as a service provider namespace). In some embodiments, this mechanism may include a file system filter driver or some other listening mechanism that is configured to intercept particular write operations for a virtualized application that is overlaid on the operating system.

In this example, any time the application writes out state or scratch data (shown as the positive exit from 820), the method may include the listening mechanism intercepting the write operation and redirecting it to a pre-determined local target storage location, as in 830. If, at that point, it is time to take a snapshot of the application state and/or scratch data, e.g., according to an event or time-based trigger (shown as the positive exit from 840), the method may include backing up the application state data and/or scratch data to a secure, pre-determined storage location on service provider resources, as 850. For example, the application state data and/or scratch data may be stored on service provider resources through a storage service (e.g., an object storage service, a file storage service, a database service or any other type of storage service) or may be stored directly to service provider storage locations, in different embodiments. Otherwise (shown as the negative exit from 840), the method may include repeating the operations illustrated at 820-830 until it is time to snapshot the application state data and/or scratch data (e.g., according to an event or time-based trigger).

While the virtualized application is still running (shown as the positive exit from 860), the method may include repeating the operations illustrated at 820-850. As illustrated in this example, once the virtualized application is no longer running (e.g., if the end user exits the application, logs off of the virtual desktop instance or virtualized computing resource instance or moves to a different machine, or if the end user's machine fails or the virtual desktop instance or virtualized computing resource instance is rebuilt), shown as the negative exit from 860, there may be no further action taken regarding the application state data and/or scratch data until or unless it is time to restore the application state data and/or scratch data (e.g., when the end user changes machines, when the machine/computing resource is restarted or rebuilt, when the virtual desktop instance is rebuilt, and/or when the application is reinstalled). At that point, however, the method may include restoring the application state data and/or scratch data to the local target storage location (where the re-launched virtualized application will expect to find it), as in 880.

As previously noted, each snapshot that is taken of application state data and/or scratch data generated by an application may be stored (e.g., on service provider resources) in association with a security token and/or an application identifier, which may allow an application delivery agent to discover, locate, and retrieve this data to restore an application to a previous state on behalf of an end user (e.g., after a machine change or failure, in response to a request to roll back an application to a previous state, or upon the re-launching of an application, virtual desktop instance, or virtualized computing resource instance). In some embodiments, each of the snapshots may also be associated with a timestamp or another type of version identifier, which may allow an end user (or an application delivery agent acting on behalf of an end user) to specify a particular snapshot to use in restoring the application. In some embodiments, the timestamp or version identifier itself may not be visible to the end user. However, the end user may be able to select (e.g., through an interface of a desktop application management module such as desktop application management module 132 in FIG. 1) an option to restore an application to its most recently persisted state, or may be able to select from among two or more previously persisted states.

In one example, an IT administrator of a customer organization may apply a setting or constraint on the use of an application by the end user that enables or disables a "snapshot and restore" option and/or that sets a maximum number of snapshots for an application that will be persisted on service provider storage resources for that end user. In some embodiments, an IT administrator of a customer organization may contract with the service provider to receive access to a "snapshot and restore" feature (e.g., for a fee) and/or may pay a fee for this option that is dependent on the number of previous snapshots that the customer organization would like to be persisted by the service provider. In various embodiments, the IT administrator may opt to receive snapshot and restore services for application state data only, for scratch data only, or for both application state data and scratch data (as applicable). In some embodiments, the systems described herein may automatically back up application state data and/or scratch data on service provider resources by default, unless the IT administrator opts out of this feature. In embodiments in which the customer organization (through an IT administrator) contracts with the service provider to receive snapshot and restore services, as described herein, the service provider may provide a guarantee that an application can be restored to a state that was persisted within a given time period (e.g., within the last ten minutes or within the last 12 hours). Again note that this feature may be independent of any feature to snapshot, persist, and/or restore the outputs or other artifacts produced by the end user when using the application (e.g., documents, presentation materials, engineering specifications/designs, or other outputs of a desktop application, some of which may be the confidential or proprietary property of the customer).

Figure 9:
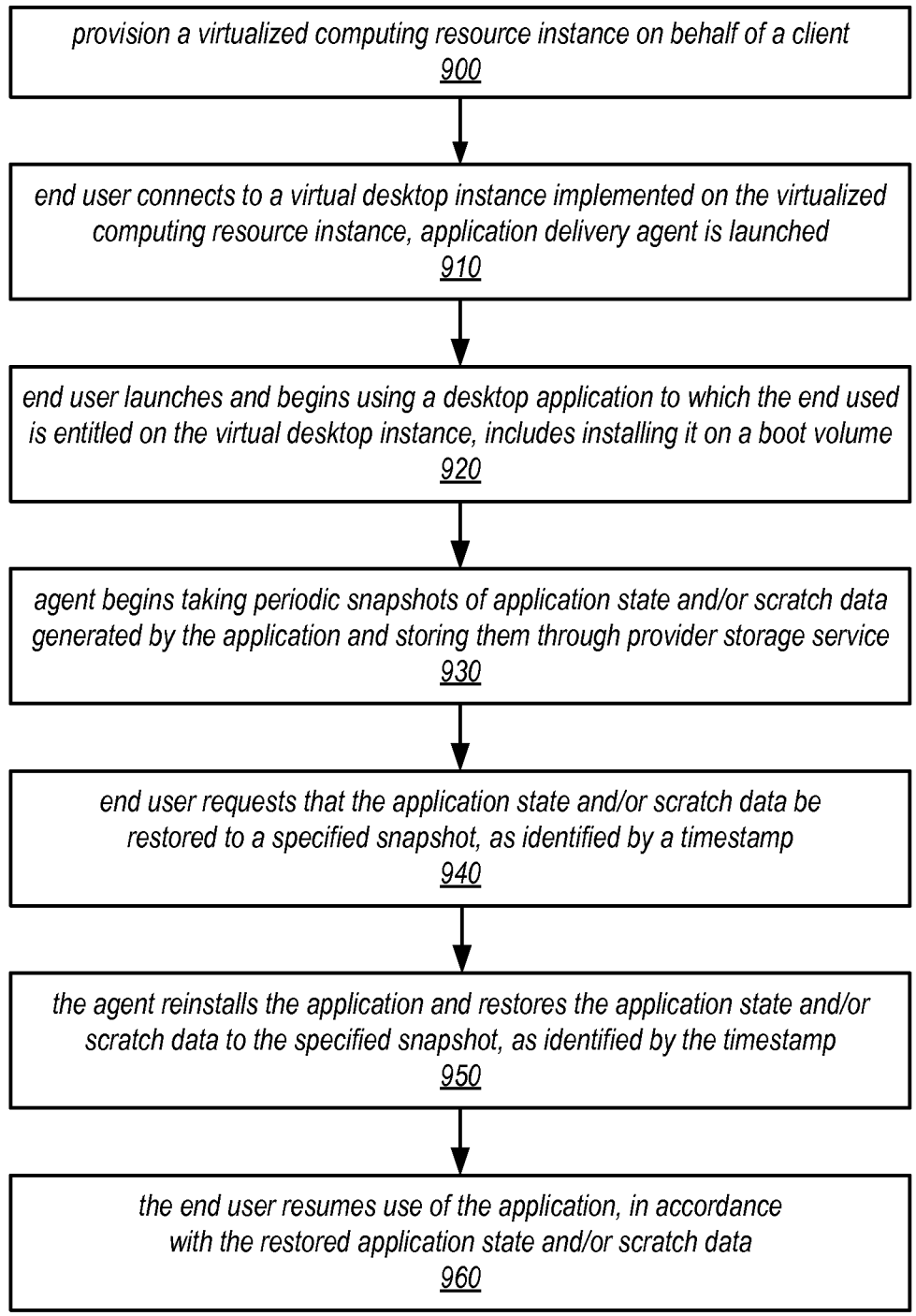
FIG. 9 is a flow diagram illustrating one embodiment of a method for restoring an application to a known persisted state.

One embodiment of a method for restoring an application to a known persisted state is illustrated by the flow diagram in FIG. 9. As illustrated at 900, in this example, the method may include provisioning a virtualized computing resource instance on behalf of a client (e.g., a customer or service subscriber). The method may include an end user (e.g., a service provider customer or an end user in a service provider customer organization) connecting to a virtual desktop instance that is implemented on the virtualized computing resource instance, and launching an application delivery agent (as in 910). For example, in some embodiments, the application delivery agent may be launched automatically when the virtual desktop instance is provisioned or when the end user logs into the virtual desktop instance. The method may include the end user launching a desktop application to which the end used is entitled on the virtual desktop instance (which may include installing the application on a boot volume of the virtual desktop instance) and beginning to use the desktop application, as in 920. As illustrated in this example, the method may include the application delivery agent beginning to take periodic snapshots of application state data and/or scratch data generated by the application and storing the snapshots through a storage service implemented by the service provider, as in 930.

As illustrated in this example, at some point the end user may request that the application state data and/or scratch data generated by the application be restored to a specified snapshot, as identified by a timestamp (as in 940). Note that the application and its state data and/or scratch data may be restored to the same computing resource instance on which it was executing when the specified snapshot was taken or to a different computing resource instance. In response, the method may include the application delivery agent reinstalling the application and restoring the application state data and/or scratch data to the specified snapshot, as identified by the timestamp (as in 950). In other words, the application delivery agent may be configured to put the application state data and/or scratch data collected for a specified snapshot back into the local memory locations (e.g., within the user volume of the virtual desktop instance) at which the reinstalled application expects to find them. The method may also include the end user resuming the use of the application, in accordance with the restored application state data and/or scratch data (as in 960).

Note that while many of the examples described herein illustrate systems and methods for dynamically reconstructing a known persistent state of a virtualized desktop application when re-launching the application on a new or rebuilt virtual desktop instance on behalf of client, these techniques may be more generally applicable in managing other types of digital assets in a cloud-based ecosystem. For example, digital assets that may be managed using the systems and techniques described herein may include images, music, video, multimedia content, software products other than desktop applications (e.g., server products, distributed applications, operating system software or components thereof) or, general, anything that is stored in a digital form and is subject to various rights and/or permissions. In some embodiments, similar techniques may be applied to any digital asset that is fulfilled on a user's physical or virtualized computing resource instance, e.g., any digital asset for which state data (e.g., configuration information or runtime settings) and/or scratch data may be generated when the digital asset is built (e.g., when it is provisioned on behalf of a user) or during its use and for which it would be beneficial to restore that data if the digital asset is later rebuilt (for any reason). For example, a virtual hosting service (of a service provider) that hosts the digital asset may be configured to store such data in a secure location on service provider resources and to restore it to the same computing resource instance or another computing resource instance if the computing resource instance fails or is rebuilt, if the user moves to a different computing resource instance, or if the user (or an agent installed on the user's computing resource instance and acting on behalf of the user) requests that the digital asset be restored to a previous state. In some embodiments, the virtual hosting service may know (or be able to determine) the specific locations at which the state data and/or scratch data that is generated when the digital asset is built or during its use is stored (e.g., locally) and may be configured to back up this data (e.g., to create a snapshot of this data and only this data) to a particular secure location on service provider resources from which it can be subsequently retrieved and restored.

In some embodiments, the application fulfillment platforms described herein may provide streamlined application distribution to the end users of a service provider customer. They may provide a fully managed service that improves efficiency and simplify administration with no infrastructure required at the customer. Through these platforms, applications may be deployed on-demand and at scale while maintaining centralized control, security and compliance from an easy-to use management console. The platforms may implement a simple process for subscription set-up that enables quick deployment of applications without on-premise infrastructure, and may allow administrators to control access to applications with granular access policy enforcement on a per user basis. In some embodiments, the application fulfillment platforms described herein may enable a service provider to handle application lifecycle management (specifically around installation, upgrades and patch management) on behalf of its customers.

As described herein, the application fulfillment platforms described herein may deploy virtualized applications as isolated containers and provide user access to their applications on any authorized device without performing application installs. The application virtualization techniques employed by the application fulfillment platforms may allow applications and application data to be moved from one virtual desktop instance to another, and may allow multiple generations and/or versions of the same application to run concurrently on a single virtual desktop instance as long as there is operating system support. They may also allow legacy applications to be executed in a virtualized environment. As described in detail here, these application fulfillment platforms may also be configured to dynamically reconstruct a known persistent state of a virtualized desktop application when re-launching the application on a new or rebuilt virtual desktop instance on behalf of client.

In some embodiments, the application fulfillment platforms described herein may support a pay-as-you-go model in which, for example, customers are billed on a per user per month basis only for the applications they use, and in which an unlimited number of a customer's own line-of-business applications may be deployed to its end users, along with any applications for which the customer has procured licenses from the service provider or an application vendor. The platforms may also allow customers to track and manage application spending with detailed application and license usage reporting on a per application basis. In addition they may allow customers to minimize up-front capital investment by using on-demand subscriptions. In some embodiments, application fulfillment platforms described herein may improve end user productivity by providing self-service access to curated applications on-demand.

Illustrative System

In at least some embodiments, a service that implements some or all of the techniques for providing on-demand delivery of desktop applications to desktops on physical computing devices and/or virtual desktops in a cloud computing environment and/or for dynamically reconstructing a known persistent state of a virtualized desktop application, as described herein, may include a computer system that includes or is configured to access a non-transitory computer-accessible (e.g., computer-readable) media, such as computer system 1000 illustrated in FIG. 10. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system similar to computer system 1000 that has been configured to provide the functionality of those components. In the illustrated embodiment, computer system 1000 includes one or more processors 1010 coupled to a system memory 1020 via an input/output (I/O) interface 1030. Computer system 1000 further includes one or more network interfaces 1040 coupled to I/O interface 1030. In some embodiments, network interfaces 1040 may include two or more network interfaces (including, e.g., one configured for communication between a virtualized computing resource hosted on the computer system 1000 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1040 may be a single network interface.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be multi-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing on-demand delivery of desktop applications to desktops on physical computing devices or virtual desktops in a cloud computing environment and/or for dynamically reconstructing a known persistent state of a virtualized desktop application, are shown stored within system memory 1020 as code 1027 and data 1026. For example, data 1026 may include information representing the assignment of selected applications to particular end users and/or user groups, constraints and/or configuration parameter settings for the selected applications, users, and catalogs, and may be stored in any of a variety of data structures or database tables within memory 1020 on one or more computing nodes of a service provider system and/or client computing device used in providing on-demand delivery of desktop applications or dynamically reconstructing a known persistent state of a virtualized desktop application, as described herein. In some embodiments, data 1026 may also include application state data or scratch data, or security tokens and/or unique identifiers of users and/or devices (physical computing devices, virtualized computing resource instances and/or virtual desktop instances), as described herein. In some embodiments, at least some of the data 1026 may be stored on a user volume within system memory 1020. In some embodiments, code 1027 may include application binaries or virtualized application packages (or portions thereof), a desktop application management module and/or an application delivery agent, at least some of which may be stored on a boot volume within system memory 1020.

In one embodiment, I/O interface 1030 may be configured to coordinate I/O traffic between processor 1010, system memory 1020, and any peripheral devices in the device, including any of network interface(s) 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface(s) 1040 may be configured to allow data to be exchanged between computer system 1000 and other devices 1060 attached to a network or networks 1050, such as other computer systems or devices as illustrated in the figures, for example. In various embodiments, network interface(s) 1040 may support communication via any suitable wired or wireless general data networks, such as types of Ethernet network, for example. Additionally, network interface(s) 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for implementing various embodiments of the techniques described herein for providing on-demand delivery of desktop applications to desktops on physical computing devices and/or virtual desktops in a cloud computing environment and/or for dynamically reconstructing a known persistent state of a virtualized desktop application. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1000 via I/O interface 1030. A non-transitory computer-accessible (e.g., computer-readable) storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface(s) 1040.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a plurality of computing nodes that collectively provide virtual computing services and storage services to one or more clients of a service provider, each of the computing nodes comprising at least one processor and a memory; and
    a virtualized computing resource instance executing on one of the computing nodes;
    wherein the virtualized computing resource instance implements a virtual desktop instance on behalf of a given end user that receives services from the service provider, and wherein an application delivery agent and one or more desktop applications are installed on the virtual desktop instance;
    wherein one or more of the plurality of computing nodes implement an application fulfillment platform;
    wherein the application delivery agent is configured to store application state data or scratch data generated by one of the one or more desktop applications to a secure location on storage resources of the service provider; and
    wherein, in response to a new virtual desktop instance being provisioned on behalf of the given end user, an application delivery agent installed on the new virtual desktop instance is configured to:
        determine that the given end user is entitled to the one of the one or more desktop applications;
        obtain the one of the one or more desktop applications from the application fulfillment platform;
        reinstall the one of the one or more desktop applications on the new virtual desktop instance;
        obtain information from the application fulfillment platform indicating the secure location at which the application state data or scratch data was stored;
        retrieve the application state data or scratch data from the secure location at which it was stored; and
        attach the application state data or scratch data to the reinstalled desktop application on the new virtual desktop instance.

2. The system of claim 1, wherein to determine that the given end user is entitled to the one of the one or more desktop applications, the application delivery agent installed on the new virtual desktop instance is configured to:
    send a request to the application fulfillment platform for information indicating desktop applications to which the given end user is entitled; and
    receive from the application fulfillment platform the information indicating one or more desktop applications to which the given end user is entitled, the information including the one of the one or more desktop applications.

3. The system of claim 2, wherein the information indicating the secure location at which the application state data or scratch data was stored is included in the information indicating the one or more desktop applications to which the given end user is entitled that is received from the application fulfillment platform.

4. The system of claim 2,
    wherein the application fulfillment platform is configured to maintain one or more data structures indicating a mapping between each of a plurality of desktop applications that are available for delivery from the application fulfillment platform and one or more end users that are entitled to each of the plurality of desktop applications; and wherein, in response to the request for the information indicating one or more desktop applications to which the given end user is entitled, the application fulfillment platform is configured to return the information, wherein the information returned is dependent on the mapping.

5. The system of claim 1,
wherein the application fulfillment platform is configured to maintain one or more data structures indicating a mapping between each of the plurality of desktop applications that are available for delivery from the application fulfillment platform and one or more end users to which a license for each of the plurality of desktop applications is currently allocated;
wherein the application delivery agent installed on the new virtual desktop instance is further configured to obtain information from the application fulfillment platform indicating that the given end user has been allocated a license for the one of the desktop applications; and
wherein the application delivery agent installed on the new virtual desktop instance is further configured to obtain and reinstall the one of the desktop applications in response to obtaining the information from the application fulfillment platform indicating that the given end user has been allocated a license for the one of the desktop applications.

6. A method, comprising:
performing, by one or more computers that collectively implement an application fulfillment platform of a service provider:
receiving, from an application delivery agent installed on a computing resource instance of a given user, a request to execute a desktop application on behalf of the given user; and
providing the desktop application to the computing resource instance of the given user for installation by the application delivery agent, wherein said providing comprises returning information to the application delivery agent indicating a location at which application state data or scratch data from a previous execution of the desktop application on behalf of the given user was stored on one or more storage resources of the service provider; and
performing, by the application delivery agent:
installing the desktop application;
retrieving the application state data or scratch data from the one or more storage resources of the service provider; and
attaching the application state data or scratch data to the installed desktop application.

7. The method of claim 6, wherein said providing comprises providing a virtualized application package for the desktop application to the computing resource instance.

8. The method of claim 6, wherein the computing resource instance of the given user comprises a physical computing device.

9. The method of claim 6, further comprising, prior to receiving the request to execute a desktop application on behalf of the given user:
storing, on the one or more storage resources of the service provider, by an application delivery agent installed on a computing resource instance on which the desktop application was previously executed on behalf of the given user, the application state data or scratch data from the previous execution of the desktop application.

10. The method of claim 9,
wherein the method further comprises determining, by the application delivery agent installed on the computing resource instance on which the desktop application was previously executed on behalf of the given user prior to said storing, that the desktop application was delivered as a virtualized application package; and
wherein said storing is performed in response to determining that the desktop application was delivered as the virtualized application package.

11. The method of claim 9, wherein said storing comprises:
creating a snapshot of the application state data or scratch data that was generated by the desktop application during the previous execution of the desktop application from a storage location on the computing resource instance on which the desktop application was previously executed on behalf of the given user; and
storing the snapshot on the one or more storage resources of the service provider.

12. The method of claim 11, wherein the storage location comprises:
a directory in standard directory structure for storing application state or scratch data for desktop applications that are executed on the computing resource instance on which the desktop application was previously executed on behalf of the given user;
a location specified in a profile associated with the given user; or
a location specified in the desktop application.

13. The method of claim 11, further comprising, prior to creating the snapshot:
intercepting operations of the desktop application that write the application state or scratch data; and
redirecting the intercepted operations to write the application state or scratch data to the storage location.

14. The method of claim 9, wherein said storing is performed at pre-determined time intervals or in response to one or more event-based triggers.

15. The method of claim 6,
wherein the computing resource instance of the given user comprises a virtualized computing resource instance or a virtual desktop instance that is different from the computing resource instance on which the desktop application was previously executed on behalf of the given user; and
wherein the computing resource instance of the given user was provisioned on behalf of the given user on the same physical computing device as a physical computing device on which the desktop application was previously executed.

16. The method of claim 6,
wherein the computing resource instance of the given user comprises a virtualized computing resource instance or a virtual desktop instance that is different from the computing resource instance on which the desktop application was previously executed on behalf of the given user; and
wherein the computing resource instance of the given user was provisioned on behalf of the given user on a different physical computing device than a physical computing device on which the desktop application was previously executed.

17. The method of claim 6,
wherein the request to execute the desktop application on behalf of the given user comprises a request to restore the desktop application to a persisted state other than a most recently persisted state; and wherein the application state data or scratch data comprises one of a plurality of snapshots of application state or scratch data stored on the one or more storage resources of the service provider during a previous execution of the desktop application; and wherein the one of the plurality of snapshots comprises a snapshot other than a most recently stored one of the plurality of snapshots.

18. The method of claim 6, wherein the application state data comprises one or more of: a configuration parameter value for the desktop application, an application template for the desktop application, or a runtime setting for the desktop application.

19. The method of claim 6, wherein said installing the desktop application comprises installing the desktop application on a boot volume of the computing resource instance of the given user; and wherein said attaching the application state data or scratch data to the installed desktop application comprises writing the application state data or scratch data to a user volume of the computing resource instance of the given user.

20. A non-transitory computer-readable storage medium storing program instructions that when executed on one or more computers cause the one or more computers to implement a service platform, wherein the service platform is configured to perform:

providing a digital asset to a computing resource of a service customer for installation on the computing resource by an agent of the computing resource of the service customer;

storing, on resources of the service platform, state data or scratch data that is generated when the digital asset it is used by the service customer, wherein said storing comprises determining one or more locations at which state data or scratch data is stored when it is generated;

subsequent to said storing, providing the digital asset to a different computing resource of the service customer for re-installation on the different computing resource of the service customer by an agent of the different computing resource of the service customer; and making the stored state data or scratch data available for use by the re-installed digital asset.

21. The non-transitory computer-readable storage medium of claim 20, wherein said re-installation is performed in response to:

a failure of the computing resource;

a move by the service customer to the different computing resource;

a rebuilding of the computing resource on behalf of the service customer;

a request made by or on behalf of the service customer to provision the digital asset on the different computing resource; or a request made by or on behalf of the service customer to restore the digital asset to a known persisted state.

22. The non-transitory computer-readable storage medium of claim 20, wherein the computing resource comprises a physical computing device.

23. The non-transitory computer-readable storage medium of claim 20, wherein the computing resource comprises a virtual desktop instance or a virtualized computing resource instance.

24. The non-transitory computer-readable storage medium of claim 20, wherein the digital asset comprises a software application.

* * * * *